Figure 1:
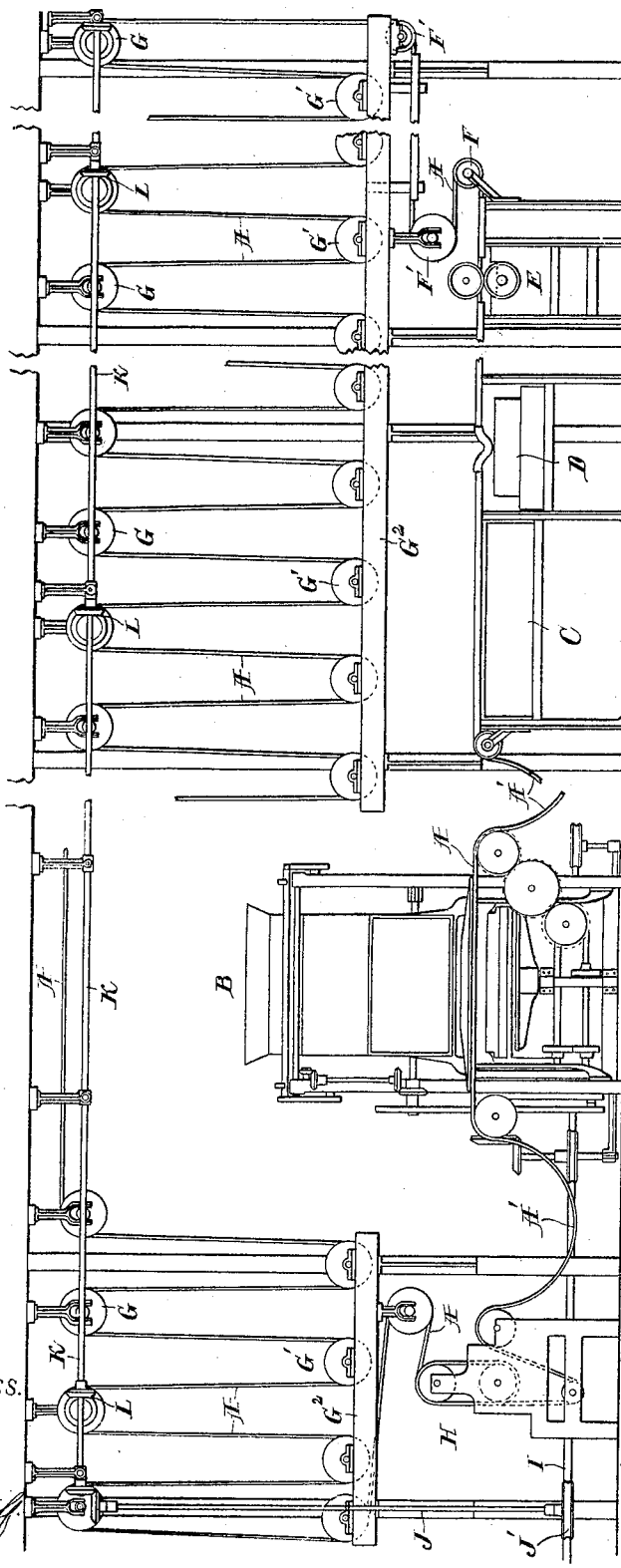

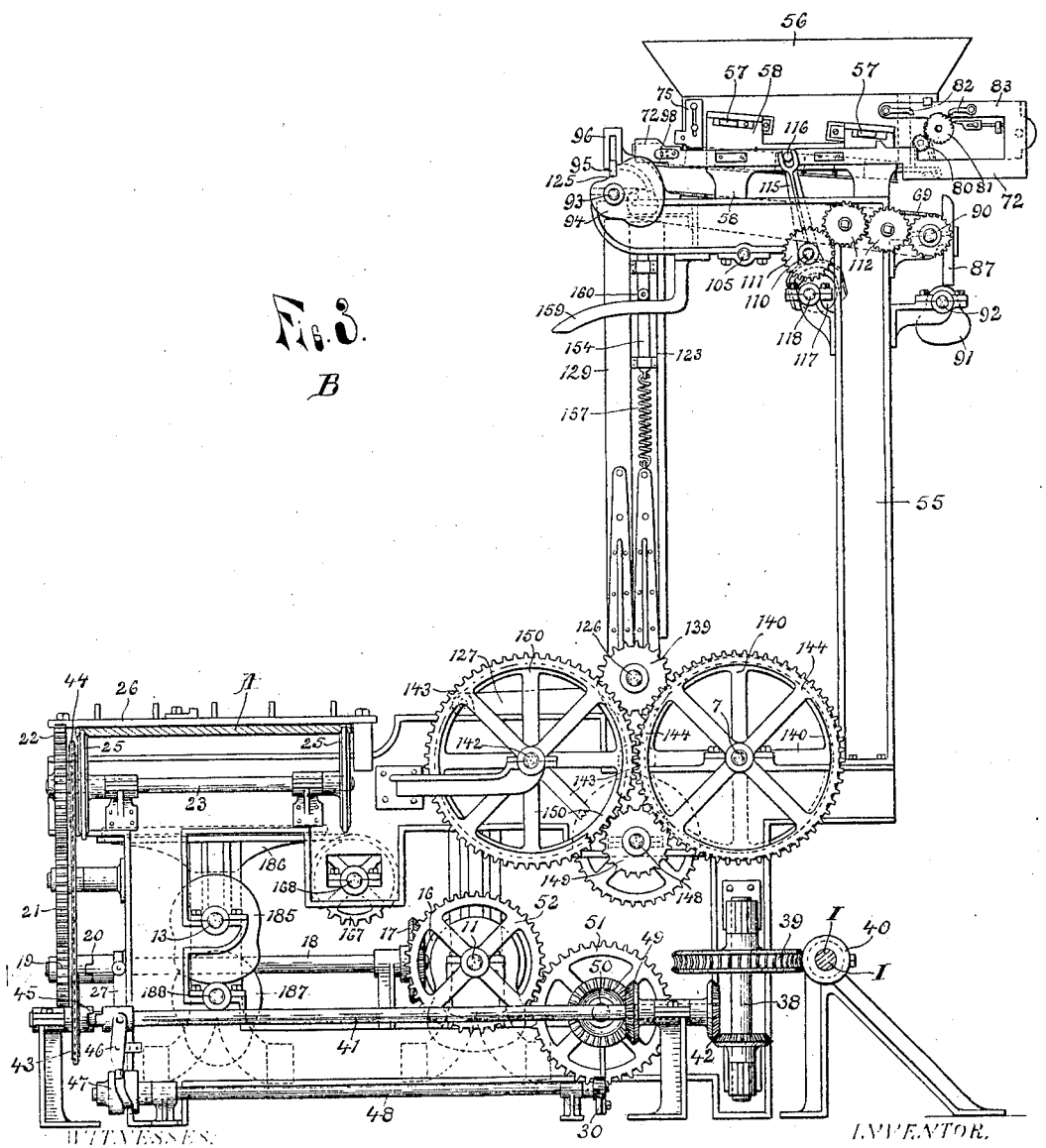

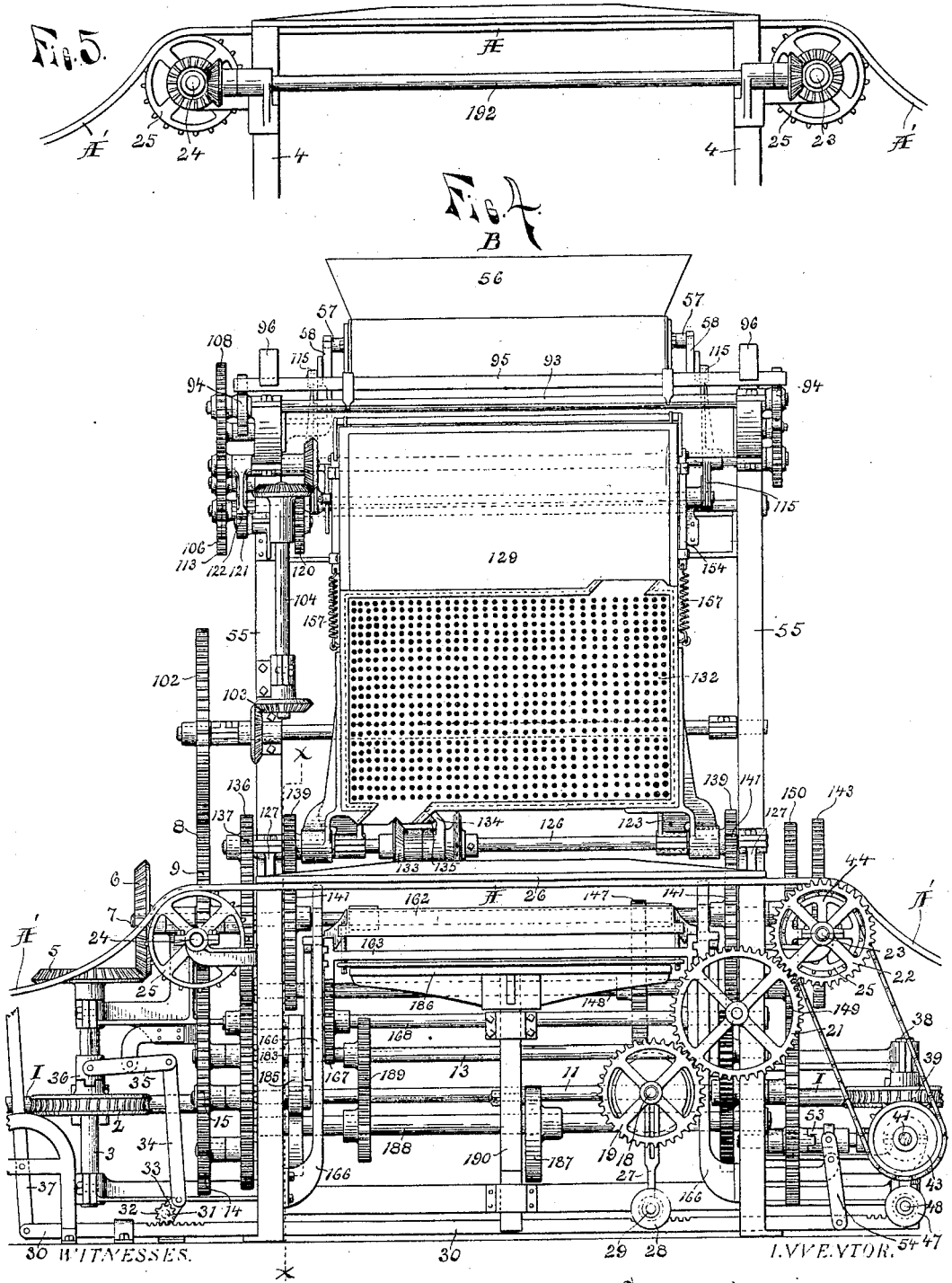

No. 803,158. PATENTED OCT. 31, 1905.
G. EVERSON.
MATCH MACHINE.
APPLICATION FILED JAN. 29, 1904.
14 SHEETS—SHEET 5.
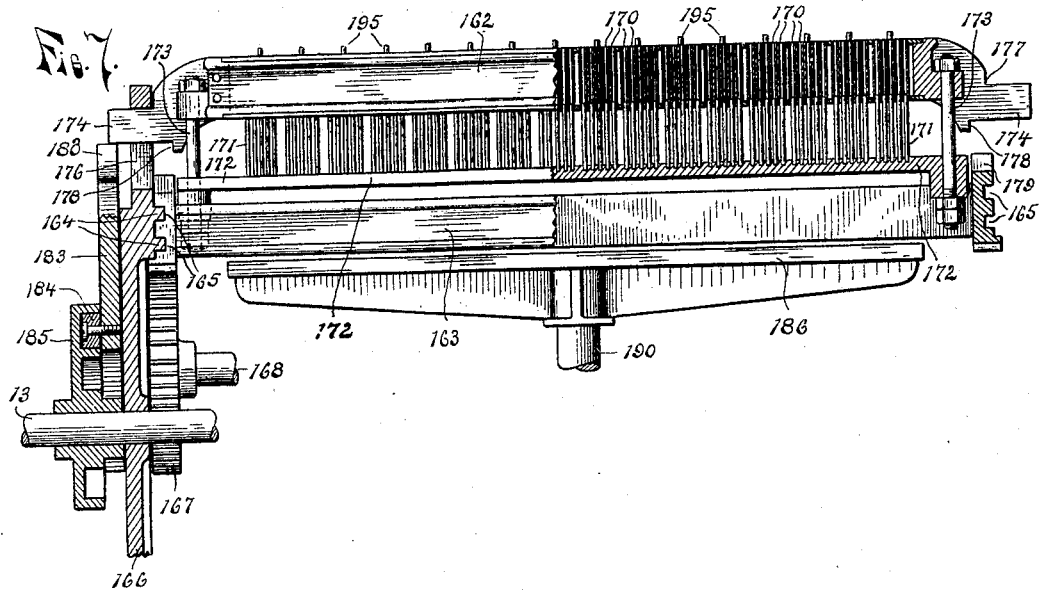
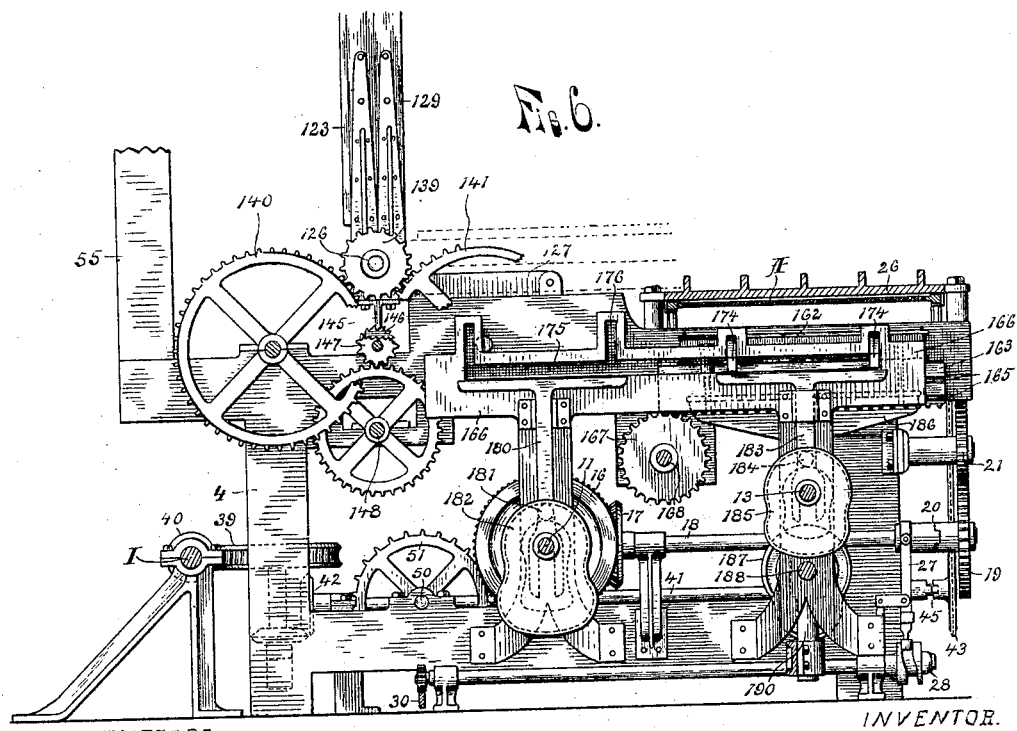
WITNESSES.
Lewis E. Flanders
Thomas A. Longstaff
INVENTOR.
George Everson
By Bartholt & Bartholt
Attorneys.

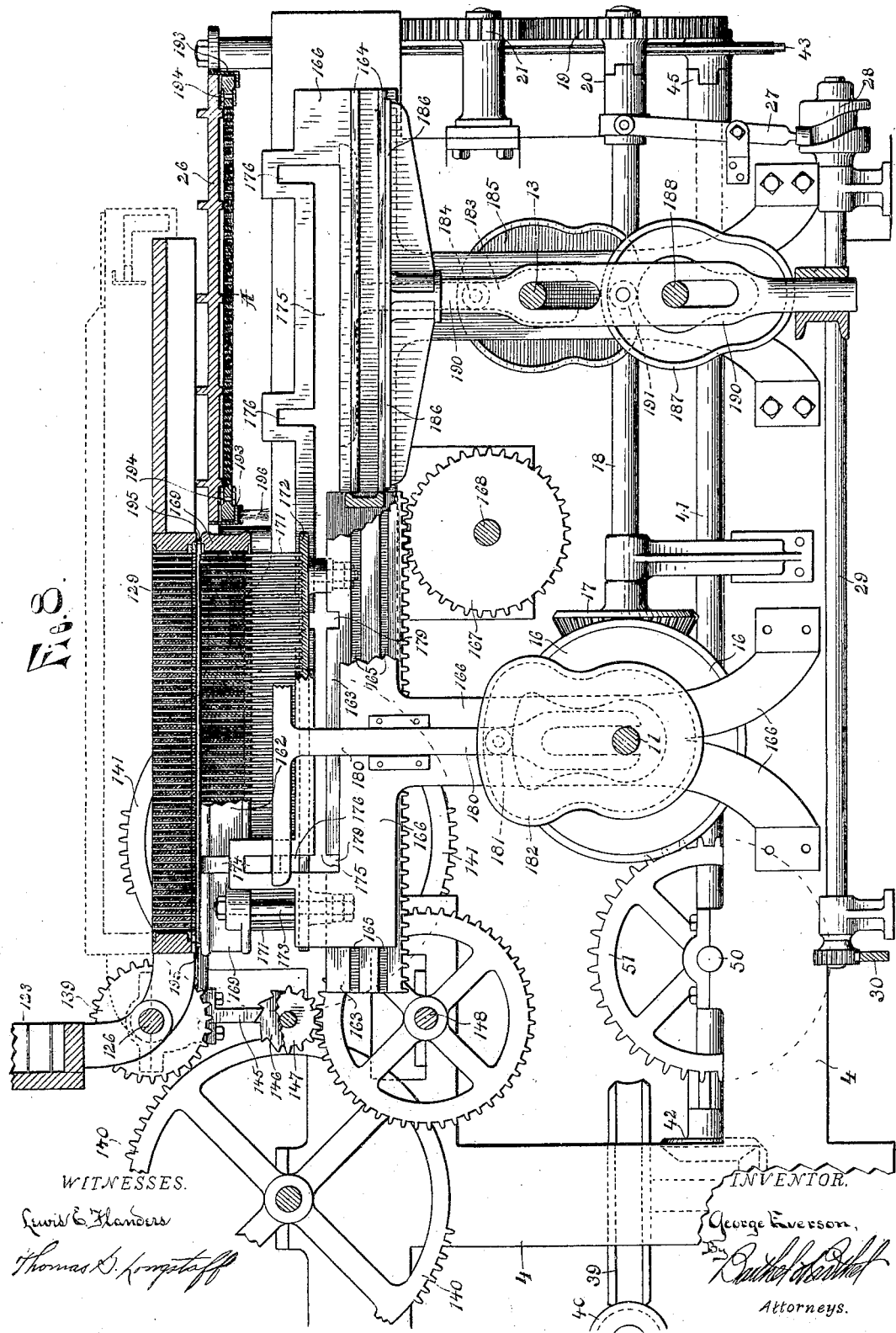

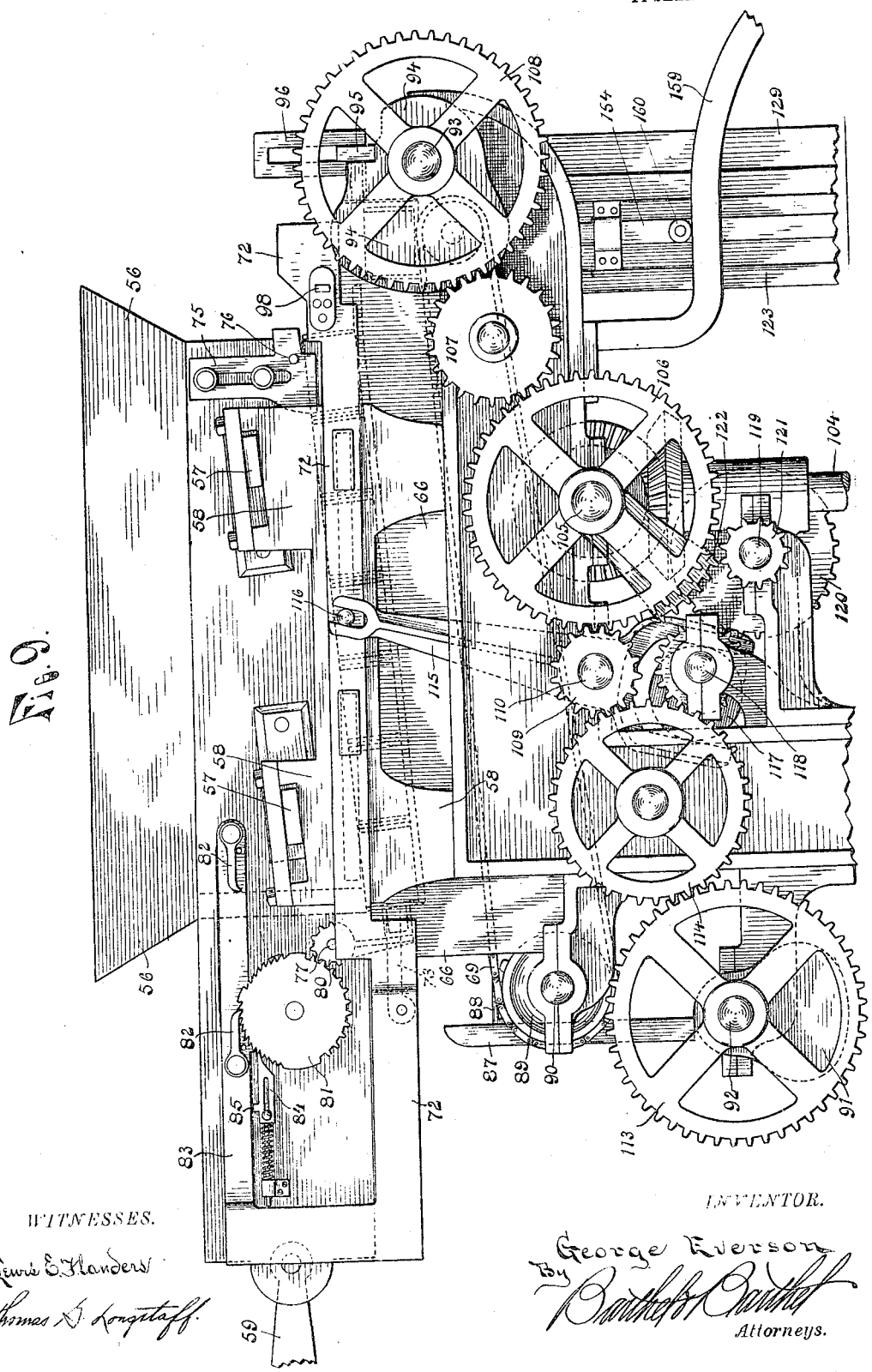

No. 803,158. PATENTED OCT. 31, 1905.
G. EVERSON.
MATCH MACHINE.
APPLICATION FILED JAN. 29, 1904.

14 SHEETS—SHEET 8.

WITNESSES:
Lewis E. Flanders
Thomas D. Longstaff

INVENTOR.
George Everson
By Barthel & Barthel
Attorneys.

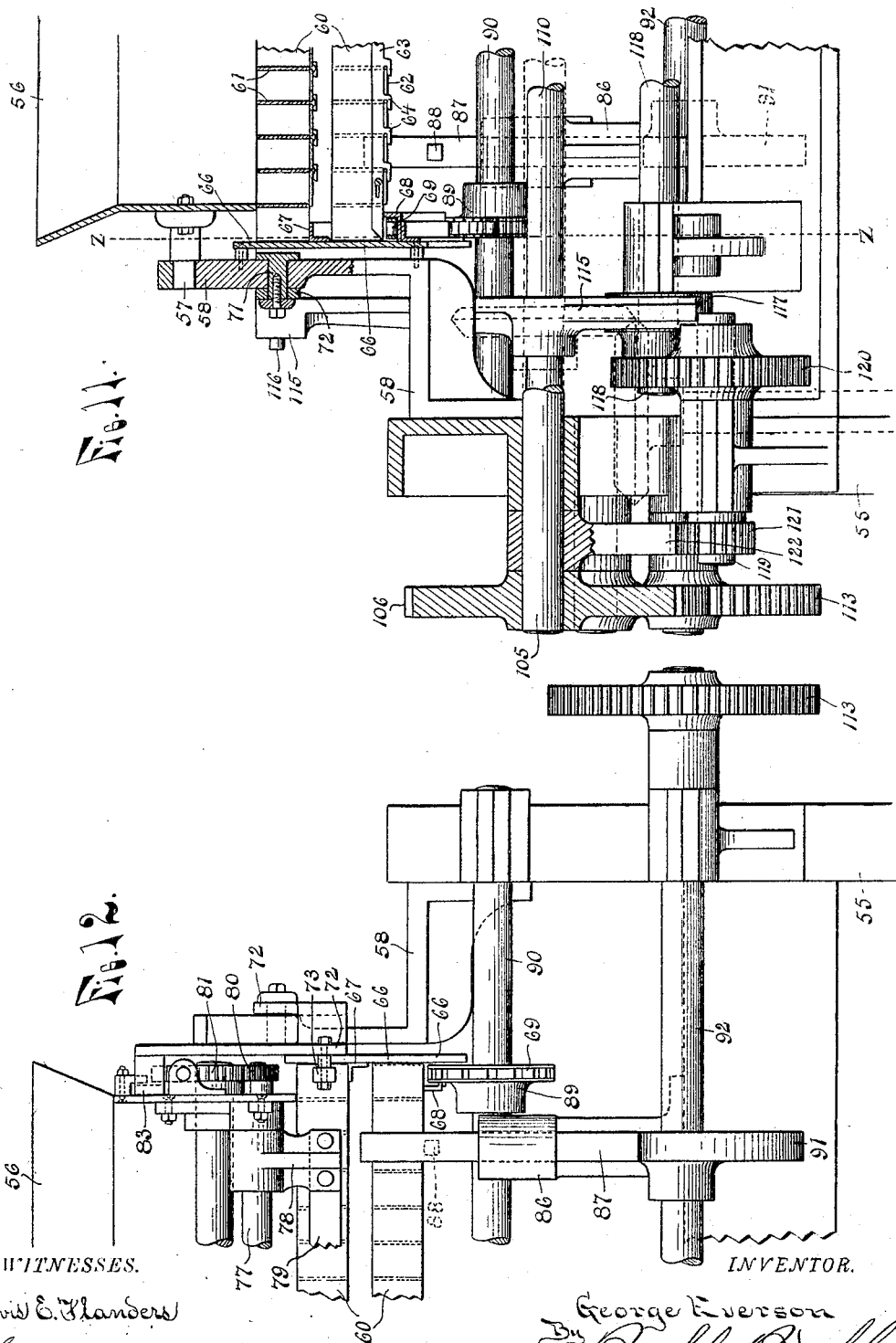

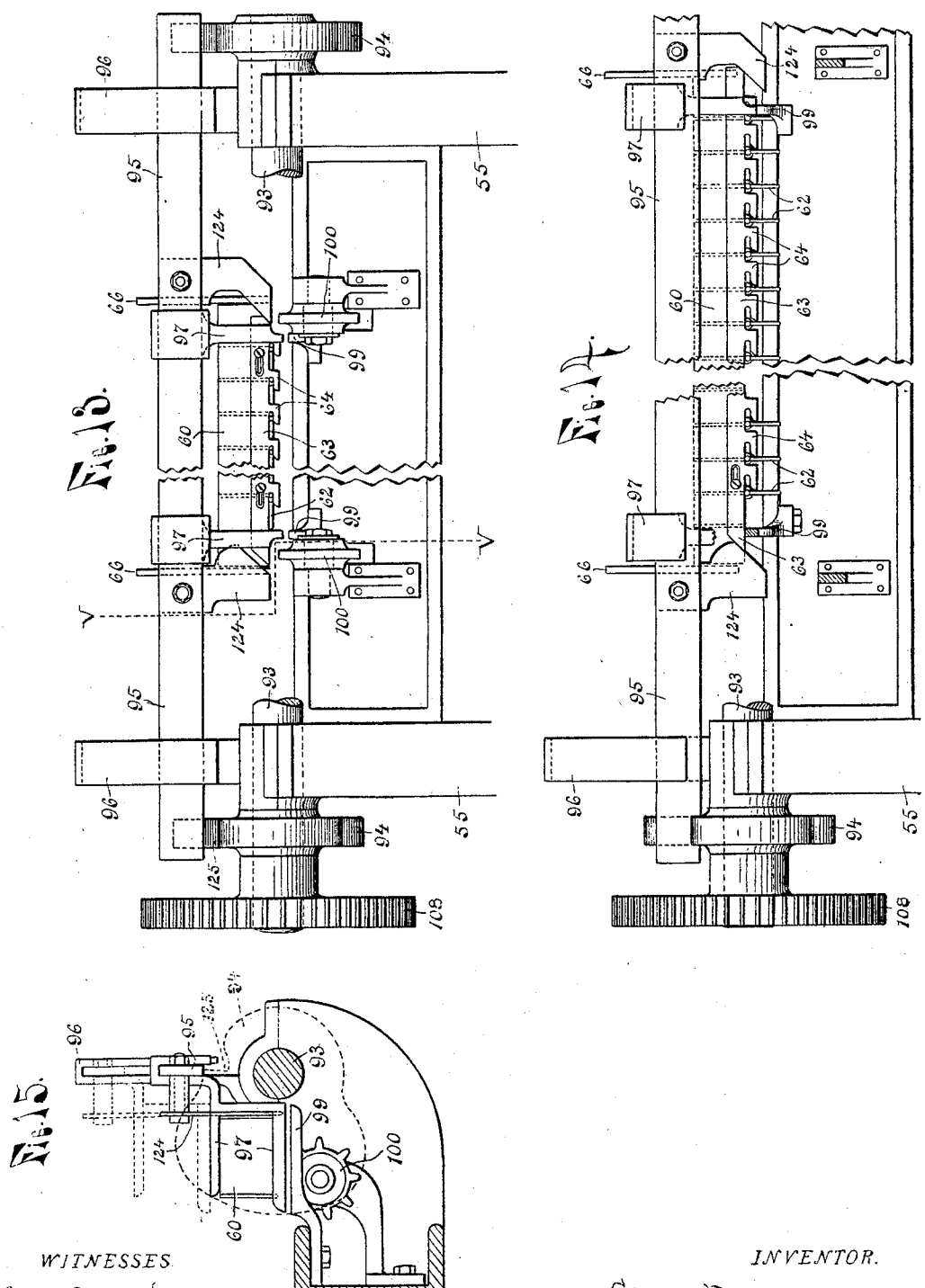

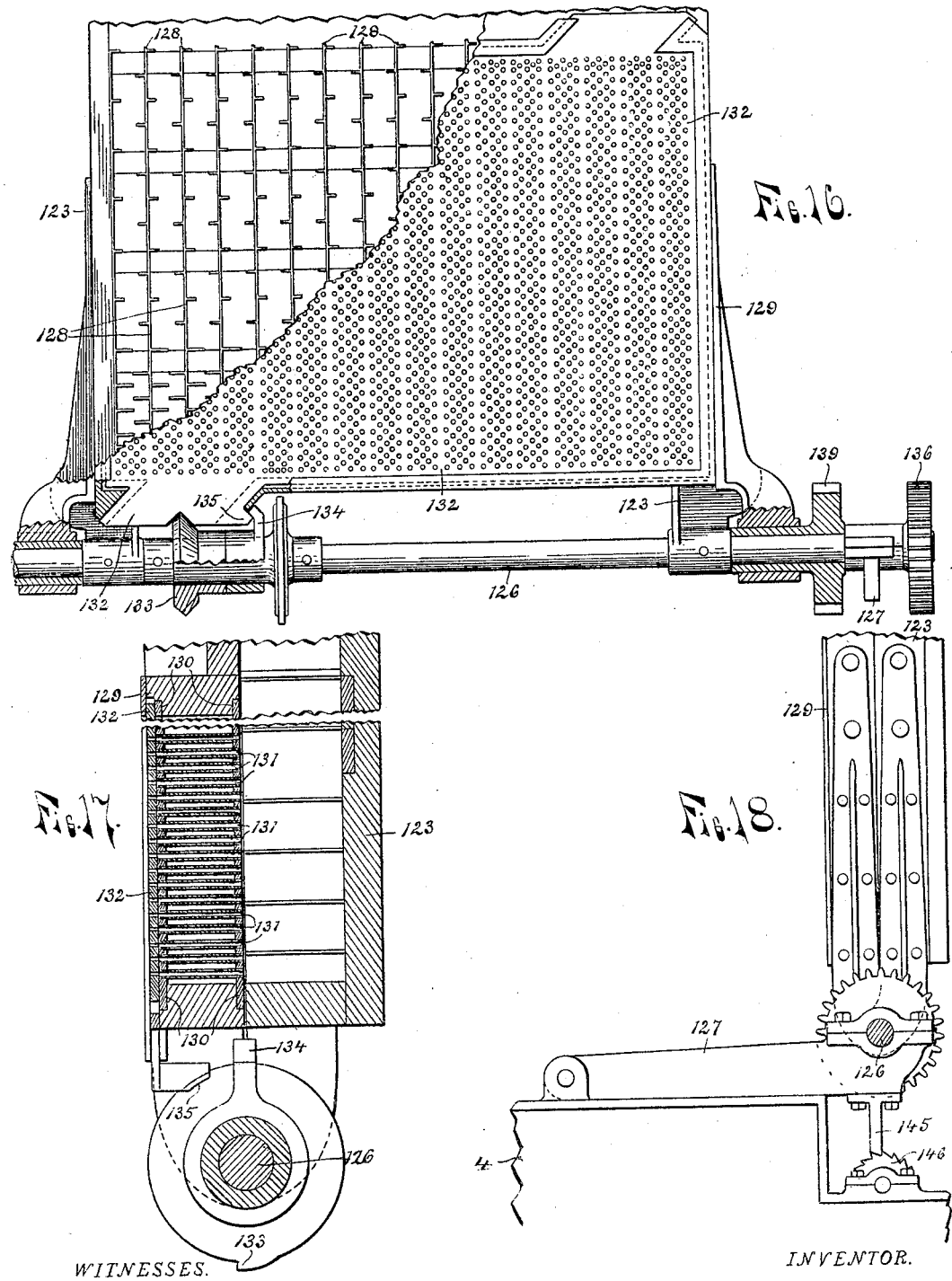

No. 803,158. PATENTED OCT. 31, 1905.
G. EVERSON.
MATCH MACHINE.
APPLICATION FILED JAN. 29, 1904.
14 SHEETS—SHEET 12.
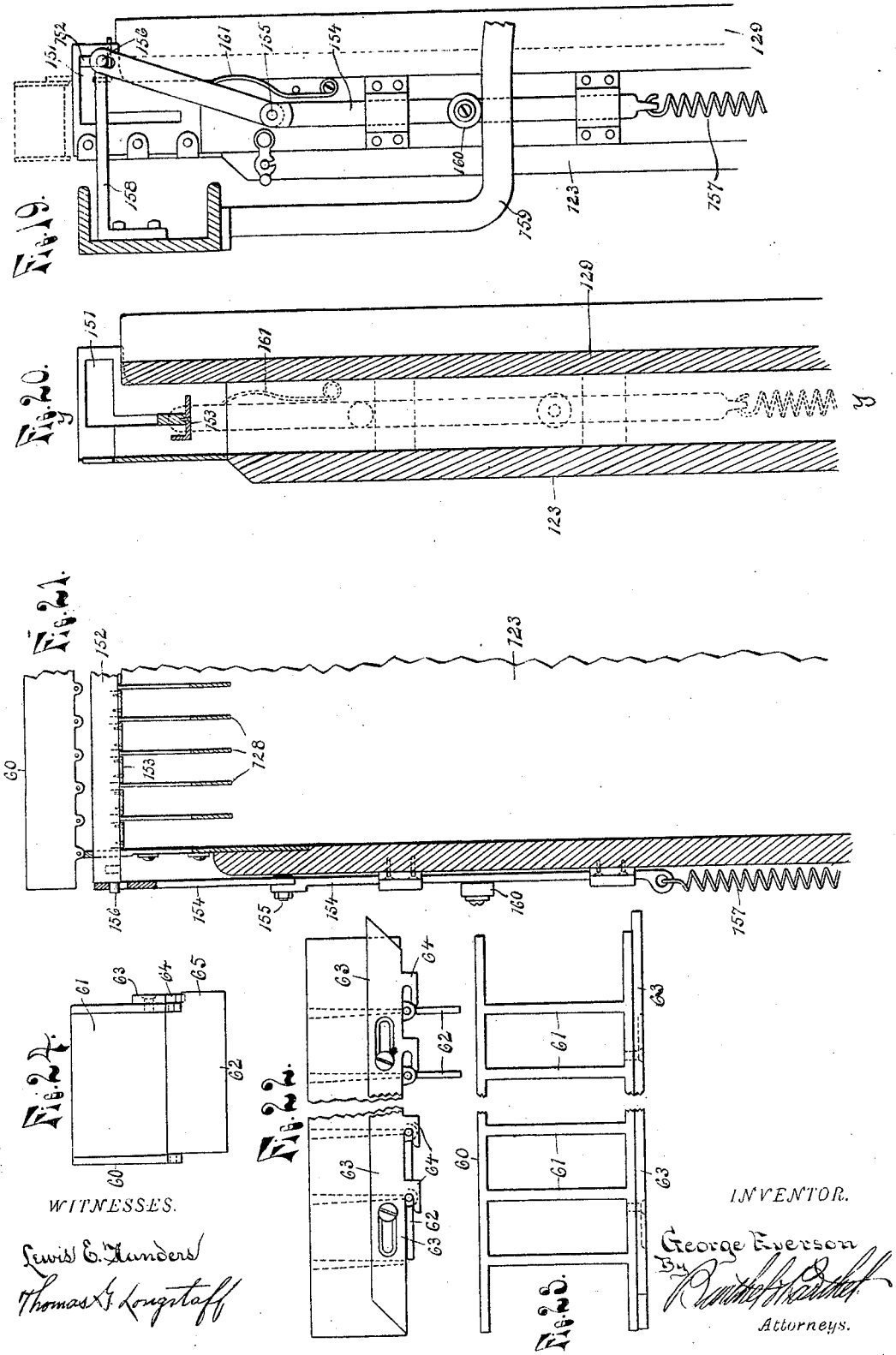

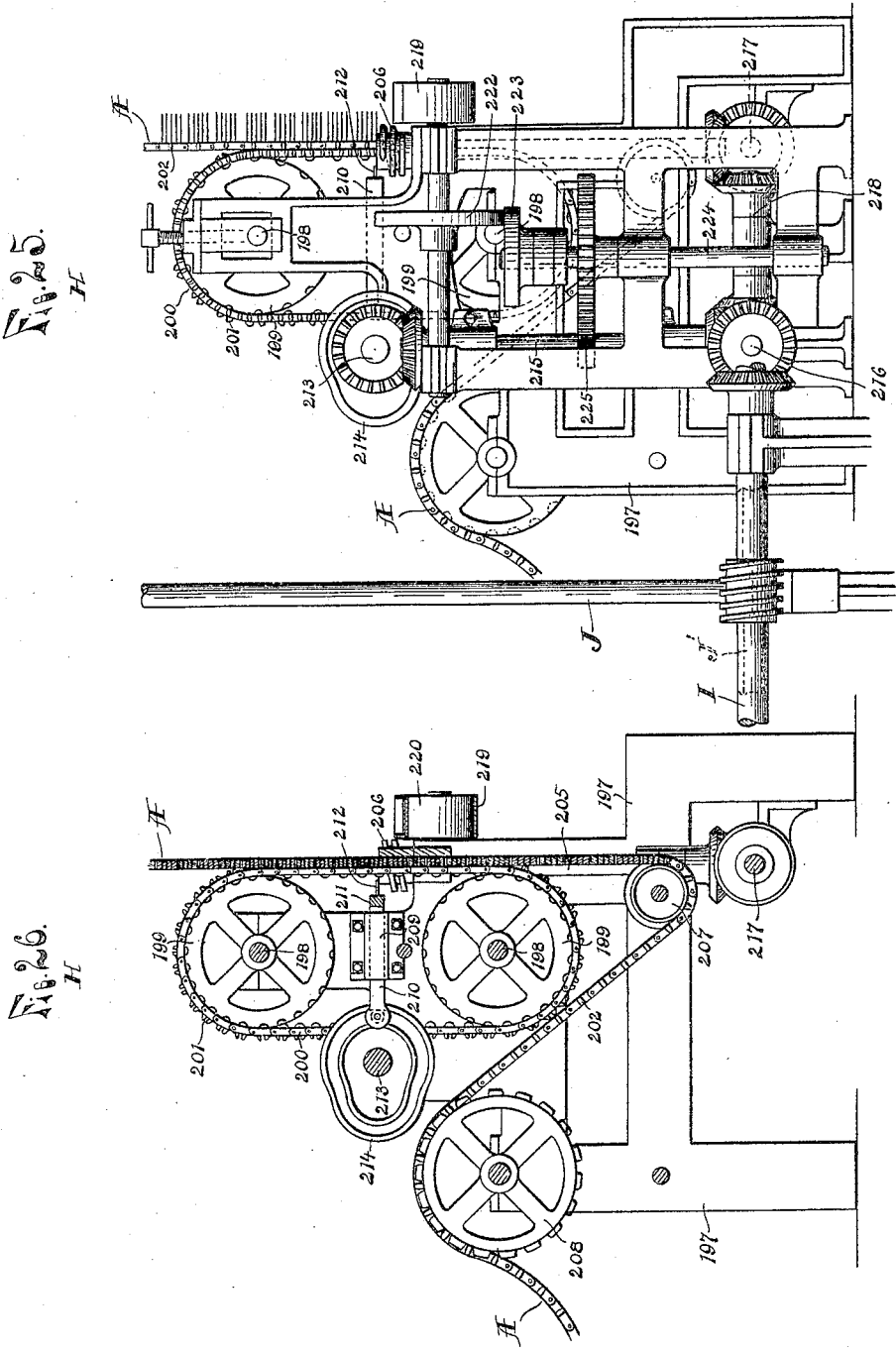

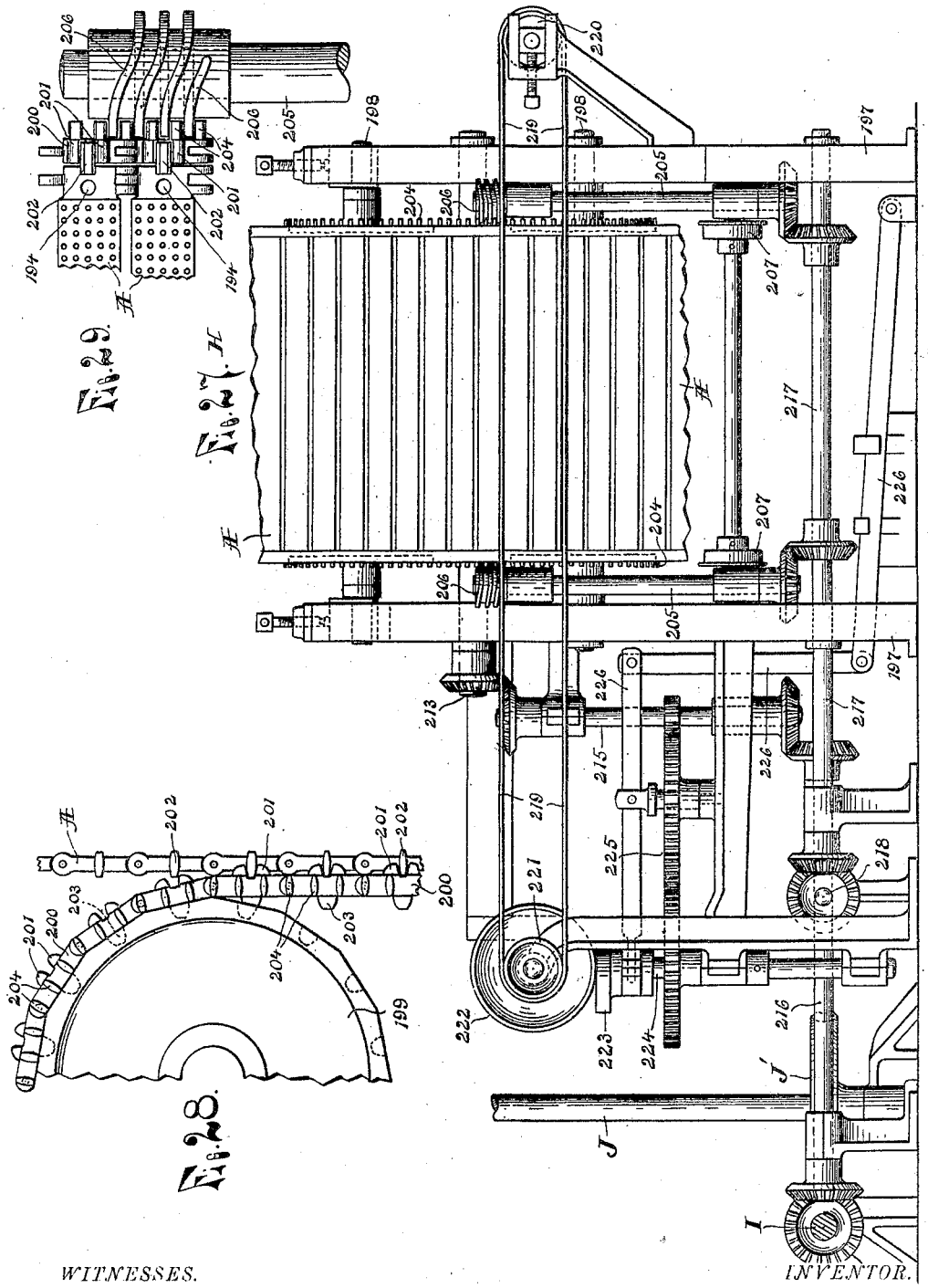

UNITED STATES PATENT OFFICE.

GEORGE EVERSON, OF DETROIT, MICHIGAN, ASSIGNOR TO THE EVERSON CONTINUOUS MATCH MACHINE CO., OF DETROIT, MICHIGAN, A CORPORATION OF MICHIGAN.

MATCH-MACHINE.

No. 803,158.　　　　Specification of Letters Patent.　　　　Patented Oct. 31, 1905.

Application filed January 29, 1904. Serial No. 191,101.

*To all whom it may concern:*

Be it known that I, GEORGE EVERSON, a citizen of the United States of America, residing at Detroit, in the county of Wayne and State of Michigan, have invented certain new and useful Improvements in Match-Machines, of which the following is a specification, reference being had therein to the accompanying drawings.

This invention relates to improvements in match-making machinery of the class in which a continuous carrier-chain formed of connected plates is employed for receiving and holding the match-splints during the operation of converting the same into finished matches; and the object of the invention is to provide a carrier-chain of this character arranged to perform its function of conveying the splints through the several stages of their manufacture without a break in the continuity of the cycle of operation from the sticking of the splints into said chain to the removing of the finished matches therefrom and also to provide the several machines for handling and converting the splints into finished matches, all so arranged as to operate in conjunction with the continuously-moving chain with despatch and accuracy. These machines consist of a machine for inserting the splints in the chain or a sticking-machine, suitable machinery for converting the splints into the finished matches or the dipping and drying machines, and the machine for removing the finished matches from the chain or the unloader, each of which machines operates independently of the others except as they are connected by the carrier-chain, and thus coöperate to automatically turn out the finished product.

A further object of the invention is to so arrange and construct the sticking-machine and operate the same in conjunction with the carrier-chain that the machine may be stopped without interfering with the operation of the carrier and so that whole sections of the chain are filled at one time, the chain being so arranged that the section being filled may be held from moving during the short space of time in which the splints are being inserted.

It is also an object of the invention to provide an unloading-machine which operates in timed relation to the movement of the carrier and operates to accurately and intermittently feed the chain past the ends of the reciprocating fingers; and the invention particularly relates to the various new and novel features in the construction, arrangement, and operation of the machines, considered separately as parts of a system in which a carrier-chain formed of hinged plates is used, all as more fully hereinafter described, and shown in the accompanying drawings, in which—

Figure 2:
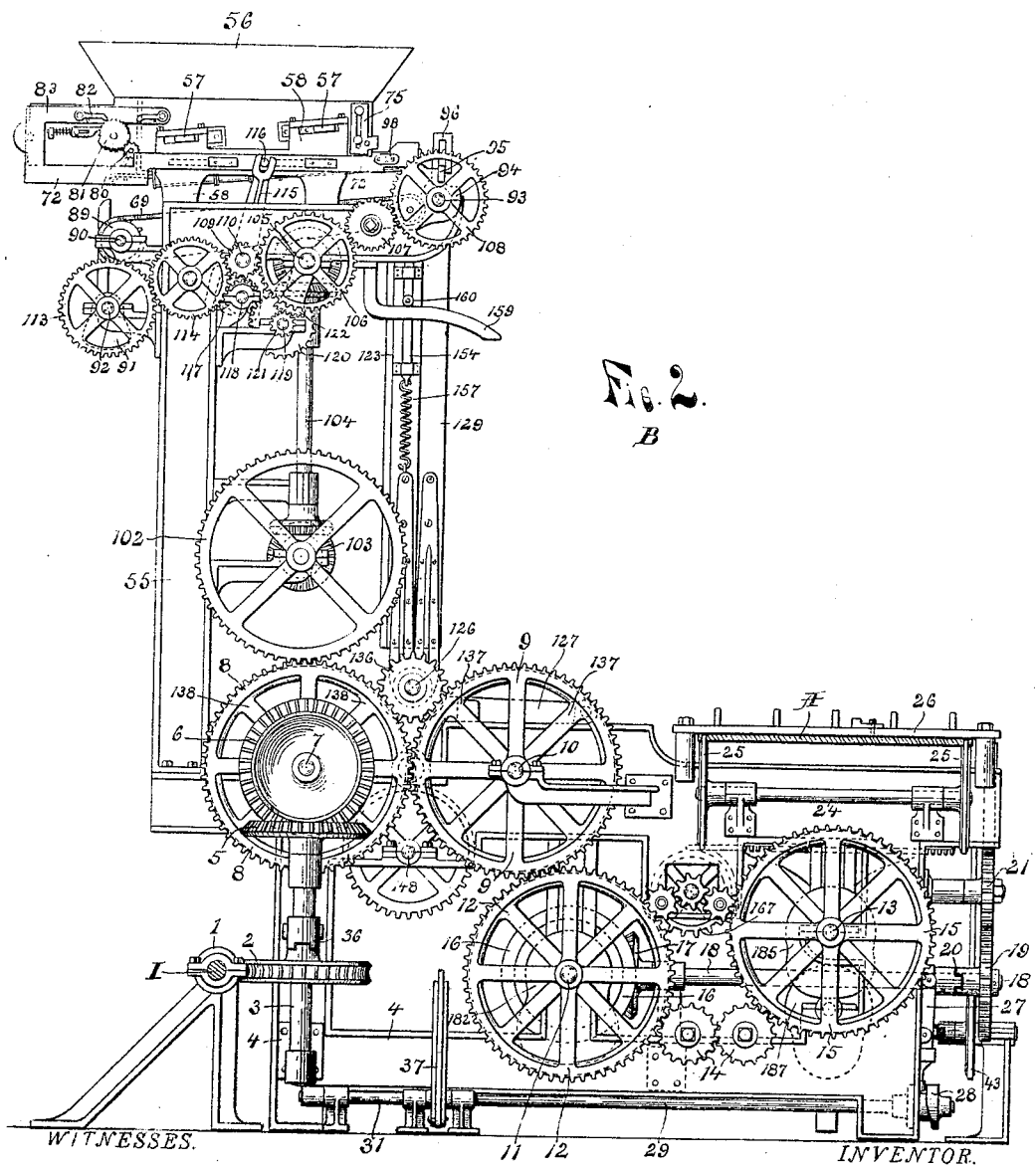
Figure 10:
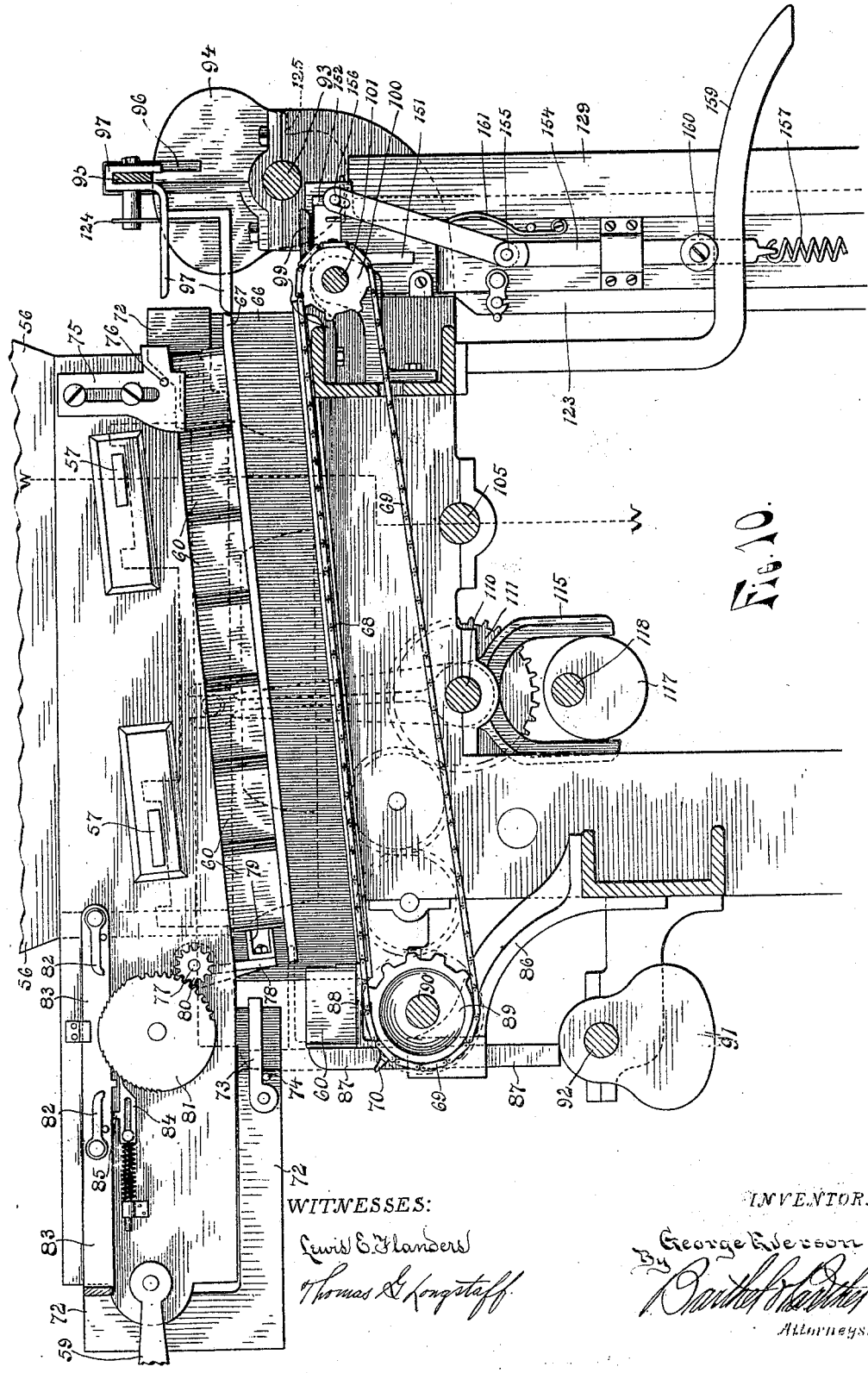

Figure 1 is a diagrammatical view showing the whole system, the path of the carrier-chain, and the position and relation of the different machines to each other and to the chain. Fig. 2 is a side elevation of the sticking-machine; Fig. 3, a side elevation of the opposite side of the same; Fig. 4, an end elevation of the same. Fig. 5 is a detail showing additional means for driving the carrier-chain. Fig. 6 is a section of the lower portion of the machine on the line $x\,x$ of Fig. 4. Fig. 7 is an enlarged detail showing the receiver, carriage, and adjacent parts partially in transverse section with the receiver raised. Fig. 8 is an enlarged view similar to that of Fig. 6 with parts broken away to show the construction and also showing the parts in other positions from that in which they are shown in Fig. 6. Fig. 9 is a side elevation of the hopper and mechanism for transferring the splints from said hopper to the magazine, shown on an enlarged scale. Fig. 10 is a section of the same on the line $z\,z$ of Fig. 11, showing the hopper, transfer-boxes, and mechanism for operating the boxes in end elevation. Fig. 11 is a section of the same on the line $w\,w$ of Fig. 10; Fig. 12, a rear elevation of one side of the same. Fig. 13 is a detail showing a front elevation of the transfer-box lowering and operating mechanism with the box-doors closed; Fig. 14, a similar view showing the box-doors open; Fig. 15, a section on the line $v\,v$ of Fig. 13. Fig. 16 is a detail showing the swinging magazine in elevation with parts broken away to show the construction. Fig. 17 is an enlarged sectional detail of the same. Fig. 18 is a detail showing a side elevation of the swinging magazines and means for vibrating the same. Fig. 19 is a detail showing an end elevation of the upper ends of the magazines and adjacent parts; Fig. 20, a similar detail showing a transverse section of the same; Fig. 21, the same showing a section on the line $y\ y$ of Fig. 20 of one side of the rear or receiving magazine. Fig. 22 is a detail showing a side elevation of one of the transfer-boxes with the middle portion of the box broken away to shorten the figure and showing the doors of one end open. Fig. 23 is a plan view of the same. Fig. 24 is an end elevation of the same with the doors open. Fig. 25 is a side elevation of the unloading-machine; Fig. 26, a vertical section of the same; Fig. 27, a front elevation thereof. Fig. 28 is an enlarged detail illustrating the manner in which the main carrier is engaged and guided by the auxiliary carrier of the unloading-machine and showing an edge elevation of said carrier and the wheel of the auxiliary carrier, and Fig. 29 is a detail showing a portion of the auxiliary carrier and worm for moving the same in elevation.

As shown in Fig. 1 of the drawings, this system of match-making consists in the particular arrangement and combination of machines, as follows:

A is the main carrier-chain, formed of hinge-connected plates, into holes in which the splints, which are previously cut and supplied, are stuck by the sticking-machine B as said chain passes therethrough. From the sticking-machine the splints are carried by the chain over a suitable heater C and on to a paraffin-tank D, where they are dipped and then passed on to the composition-rolls E. The chain after passing the composition-rolls passes around the sprockets F and backward a short distance to bring the splints at the upper side of the chain in a vertical position for a short time to allow the composition to settle down on the ends of the splints before it becomes hard and then passes over the sprockets F' and upward to the sprockets G, journaled on brackets on the ceiling. A suitable supporting-frame $G^2$ is provided for the sprockets G' at a distance above the machines C, D, and E, and the carrier-chain passes up and down over the sprockets G and G' throughout the length of the room or as far as necessary for the matches to travel before they are thoroughly dried and then passes downward through the unloading-machine H, where the finished matches are removed, and thence back to the sticking-machine, making a complete circuit or cycle of operation. At each side of the sticking-machine the carrier-chain hangs slack, as at A', so that said machine and the unloading-machine may operate intermittently—that is, so that the portions of the chain passing through these machines may be stopped and started to allow the splints to be inserted or removed without interfering with the continuous travel of the remainder of the chain.

I is the main driving-shaft, from which motion is taken to drive the several machines, and a vertically-extending shaft J transmits motion from the main shaft, by means of a worm-gear J' and gear $J^2$, to a counter-shaft K, supported by brackets from the ceiling, which counter-shaft drives, by means of bevel-gears L, short shafts provided at intervals along its length, upon which are secured the sprocket-wheels G. The carrier-chain is thus driven at intervals throughout its length, and all motion is taken from the one main driving-shaft. The main driving-shaft I is supported by suitable brackets from the floor and extends past the "rear" end (so called for convenience of description) of the sticking-machine, as shown in Fig. 2, and motion is taken from this shaft to drive the machine by providing a worm 1, secured thereon in mesh with a worm-gear 2 on a vertical shaft 3, supported in bearing-brackets on the machine-frame 4. On the upper end of this vertical shaft is secured a bevel-gear 5 in mesh with a bevel-gear 6 on the end of a shaft 7, mounted in bearings on the frame and extending across the same, and secured on the shaft 7 adjacent to the gear 6 is a gear 8 of large diameter, which is in mesh with a gear 9 of the same diameter and transmits motion to the stub-shaft 10, journaled at its outer end in a bracket extending from the frame and projecting through the frame at its opposite end. The gear 9 in turn transmits motion to the cam-shaft 11 by being in mesh with a corresponding gear 12 on the outer end of said cam-shaft, and said gear 12 transmits motion from the cam-shaft 11 to the cam-shaft 13 by means of idlers 14 on the frame and a gear 15 of the same diameter as the other large gears secured on the outer end of said cam-shaft 13. The cam-shafts 11 and 13 are mounted in bearings on the frame and extend across the same, the shaft 11 being provided inside the frame and near the side thereof shown in Fig. 3 with a forty-eight-toothed bevel-gear 16, having sixteen teeth blank, which gear transmits an intermittent motion to a shaft 18, extending longitudinally of the frame at right angles to the cam-shaft by means of a thirty-two-toothed bevel-gear 17 on the end of the shaft 18. On the outer end of the shaft 18 is loosely mounted a gear 19, and a clutch 20 on the shaft is provided to secure said gear to the shaft to turn therewith, which gear 19 when so secured to the shaft transmits motion, by means of the idler 21, to the gear 22 on the end of the sprocket-wheel shaft 23, mounted in bearings on the ends of brackets extending outward from the side of the frame and near the top thereof. At the opposite side of the frame (on the side shown in Fig. 2) is a similar sprocket-wheel shaft 24, each of said shafts 23 and 24 being provided at each end with a large sprocket-wheel 25 to engage and intermittently move that portion of the main carrier-chain A which passes through this sticking-machine, said chain passing transversely across the top of the frame at the forward end thereof and beneath a heavy cast plate 26, supported at each corner by posts on the frame, to which it is secured by bolts, said plate forming a bed to back up the chain. As shown in Fig. 5, the two sprocket-wheel shafts may be connected so that both will be positively driven by mounting a transverse shaft 192 in bearings on the frame and connecting the same by bevel-gears to the sprocket-wheel shafts. The section of chain to be loaded is thus relieved of all strain, and therefore should the chain stretch by the wearing of its joints this will not prevent the centering of the plates composing the chain, as the distance from the sprockets 25 at one side of the machine to those at the opposite side cannot vary, and the section of chain between is supported and guided against lateral movement by the angle-iron guideways 193 on the plate 26. (See Fig. 8.)

When it is desirable to stop the sticking-machine on account of the unfinished matches which are still in the carrier-chain, the chain cannot be stopped without great waste. Therefore means are provided whereby the mechanism for sticking the matches is disconnected from the main shaft and carrier-chain and other means provided for driving the carrier, the one being thrown out of operative position and the other thrown in by a single lever. The mechanism for this purpose consists in providing a lever 27 for moving the clutch 20 to secure the gear 19 to its shaft or release the same, said lever being operated by a cam member 28 on the end of the shaft 29, which extends longitudinally of the frame near the floor and is provided at its opposite end with a pinion engaging with teeth on a rack-bar 30. A short shaft 31 at the side of the frame extends longitudinally toward a point opposite the vertical shaft 3 and is provided at one end with a pinion 32 to engage the rack-bar and at its opposite end with an arm 33, connected by a link 34 to a lever 35, connected to a clutch member 36 on the shaft 3 to operate the same. The worm-gear 2 is loose on the shaft and drives the shaft 3 by means of said clutch 36, so that when said clutch is disconnected and also the clutch 20 the splint handling and sticking mechanism will stand still. These clutches are operated by means of a hand-lever 37 at one side of the machine to move the rack-bar longitudinally, and thus rotate the shafts 29 and 31 to throw the clutches.

To drive that portion of the main carrier A which passes through the sticking-machine when said machine is stopped, as just described, a short vertical shaft 38, similar to the shaft 3, is provided at the side of the machine shown in Fig. 3, and on this shaft is a worm-gear 39 in mesh with a worm 40 on the main driving-shaft. Motion is transmitted from the shaft 38 to a longitudinally-extending shaft 41 by bevel-gears 42, and sleeved on the opposite end of the shaft 41 is a sprocket-wheel engaged by a sprocket-chain engaging a similar sprocket 44 on the shaft 23, which drives the carrier. The sprocket 43 is locked to the shaft 41 by a clutch 45, said clutch being moved by a lever 46, which is operated by a cam 47 on the end of a shaft 48, the opposite end of said shaft being provided with a pinion to engage the rack-bar 30, whereby when the rack-bar is moved longitudinally the shaft 48 will be rotated and the clutch 45 operated to release its sprocket when the sticking mechanism is thrown into gear and to lock its sprocket to the shaft 41 when the machine is thrown out of gear. The cam-shaft 11 is also driven from the right-hand side of the machine, or the side shown in Fig. 3, by providing the shaft 41, which is continuously driven, with a bevel-gear 49, which is in mesh with a bevel-gear on a stub-shaft 50, journaled on the frame and provided with a gear 51 to transmit motion to a similar gear 52 on the end of the cam-shaft 11. The gear 51 is loose on the stub-shaft, and a clutch 53 is provided to lock said gear to the shaft, which clutch is operated by a lever 54, connected to the rack-bar 30, so that when said bar is moved to throw the machine in and out of gear said clutch will also be thrown in or out.

To the extreme rear end of the machine-frame 4 and extending vertically upward therefrom is secured the frame 55, upon the upper end of which the hopper 56 is supported. The previously-prepared splints are put into this hopper, which is supported upon the frame by trunnions 57, extending from its sides and engaging bearings in the brackets 58, said bearings being such that the trunnions may move therein to allow the hopper to be vibrated by an eccentric attached thereto by an arm 59 or any other suitable means operating in timed relation to the other mechanism to shake the splints down into the transfer-boxes 60, which lie closely together and form the bottom of the hopper. The transfer-boxes are independent rectangular boxes of a length to extend across the hopper with their end walls directly beneath the side walls of the hopper and of such a number that when lying side by side in contact with each other they will cover the bottom of the hopper, and each is of a width slightly greater than the length of the splints. Transverse walls 61, spaced apart a distance considerably less than the length of the splints, divide the boxes into compartments, so that the splints can lie therein only in one direction, and the bottom of each compartment is formed by a door 62, provided with pins at one edge to engage the openings in ears on the box and form hinges to connect the doors to the boxes. A longitudinally-movable bar 63 is secured to one side of each box by providing the bar with slots through which screws pass, and on the lower edge of this bar are formed hooks 64, opening in a direction longitudinally of the box. One end of each door is extended at 65 past the ear to which it is pivoted, so that when the doors are closed and the bar is moved longitudinally said hooks will embrace the extensions 65 and hold the door closed and when moved in the opposite direction the hooks will disengage the extensions and the doors will fall open in line with the partition-walls 61. The ends of the hooks 64 are rounded slightly, so that when the doors are open and the bar is moved the ends of the hooks will engage the extensions 65 at a distance from their pivots and swing the same closed. The side walls of the transfer-boxes are extended beyond the end walls thereof and beyond the walls of the hopper and engage and are guided by guide-plates 66, secured to the brackets 58, and are supported at each end by an angle-iron 67, secured to each guide-plate and forming ways upon which the boxes slide, these ways being such a distance below the hopper that the upper edges of the boxes move so close to the lower edge of the hopper that the matches cannot escape between. The lower edge of the hopper is formed on a slant upward from its rear side, and the way 67 is correspondingly slanted upward, so that as the hopper is vibrated the tendency of the matches will be to work toward the rear of the hopper. Directly below the way 67 and parallel therewith is a second way 68, secured to said plate 66 and formed of angle-iron, with a flange extending upward from its inner edge, and thus forming a groove between said flange and the plate for the sprocket-chain 69, which is guided therein, and the upper edge of said flange forms the way to engage and support the boxes, a lug 70 being provided on the chain to engage each box after it is lowered from the upper to the lower way at the front end of the hopper and move the same to the rear end of said way, where it is lifted by suitable mechanism to the upper way again and shoved in beneath the hopper, the forcing in of the box at the rear end of the hopper forcing out a full box at the forward end thereof. The brackets 58 are slotted longitudinally, and extending through said slots are studs 71, movable therein to secure the operating-bars 72 to said brackets and allow the same to be moved longitudinally thereon. Each of said bars is bent inward at the rear of said brackets, and pivoted at its rear end to the inner side of each, adjacent to said bend, is a dog 73, free to rise, but held from falling below a horizontal position by a pin 74, so that when the box is raised from the lower to the upper way and strikes the dogs before the bars 72 have reached the rear end of their stroke said dogs may rise to allow the box to come in line with the upper way and will drop behind the box when the bar reaches the end of its stroke and on the forward movement thereof will engage the box and shove the same beneath the hopper. While the boxes are being taken from and inserted beneath the hopper the mechanism for shaking the hopper is inoperative; but when the boxes are in position they and the hopper are vibrated by said mechanism, and therefore it is necessary to provide means for locking the boxes in position beneath the hopper. This consists, at the forward end of the hopper, in vertically-movable slotted locking-bars 75, secured to the sides of the hopper by screws passing through the slots thereof, which bars are adapted to fall by gravity into engagement with the forward box, with their lower ends between the projecting sides of the box, and on each bar is an outwardly-projecting pin 76, adapted to be engaged by an incline on each of the operating-bars 72 to lift the locking-bars out of engagement with the box upon the rearward movement of the operating-bars. The boxes are locked in the hopper at the rear end thereof by journaling a transverse rock-shaft 77 on the rearwardly-extending side walls of the hopper and securing to this shaft, adjacent to the inner sides of the walls, downwardly-extending arms 78, to the lower ends of which is secured a channel-bar 79 to engage the rear side of the rear box, and on the outer ends of said shaft are secured pinions 80, engaged by disks 81, journaled on the walls, and provided with gear-teeth at one side to engage the pinions and ratchet-teeth at their opposite sides, adapted to be engaged by pawls 82, carried by forwardly-extending arms 83 on the operating-bars 72, one pawl to engage the disk and turn the same to turn the rock-shaft and swing the bar 79 out of engagement with the box just before the operating-bars 72 reach the extreme of their rearward movement and the other pawl to turn the disk in the opposite direction to move the bar into engagement with the box as the operating-bars near the forward end of their stroke. After being swung into engagement with the box the locking-bar is held in that position by a spring-latch 84 on the wall of the hopper engaging the ratchet-teeth on the disk, and to disengage this latch from the disk to allow the disk to be turned by the pawl at the opposite side thereof a lug 85 is provided on the latch in line with a lug on the arm 83, each so positioned that the latch will be disengaged by the engagement of said lugs before the pawl 82 engages said disk.

Secured to a cross-bar of the frame, near each side thereof, are the rearwardly-extending brackets 86, having vertical bearings for vertically-movable bars 87, to the forward side of which are secured the forwardly-extending arms 88 to receive the boxes as they are carried toward the rear of the machine by the sprocket-chains 69. These arms extend in the path of said chains when the bars 87 are in their lowered position, so that the boxes slide directly onto these arms from the chains, which turn around sprocket-wheels 89 on a shaft 90, extending across the frame directly beneath. To raise the bars 87 after the box has been delivered by the chains to the arms, cams 91, mounted upon a transverse shaft 92, are provided to engage the lower ends of said bars and raise the same in timed relation to the movement of the other parts.

Journaled in bearings on the frame adjacent to the forward end of the lower way 68 is a shaft 93, extending across the frame and provided at each end adjacent to the outer side of the frame with a cam 94, upon which cams rests a transverse bar 95, said bar being guided by guides 96, secured to the frame and rising or falling with a free vertical movement in said guides as the cams revolve and by their shape raise the bar or allow it to fall by its own gravity. Attached to the bar 95 to rise and fall therewith by being provided with a hook to fit over the bar and extending laterally therefrom toward the ends of the ways are the receiving-brackets 97 to receive the boxes from the upper way and lower them to the lower way, each of said brackets consisting of an upper and a lower parallel arm, the lower arm forming a continuation of or lying in the plane of the upper way when the brackets are raised and of the lower way when lowered, so that when the forward box in the hopper is moved forward by the catches 98 on the forward ends of the operating-bars 72, provided to engage the rear side of said box when the said bars are at the rear ends of their strokes, said box will be carried forward directly into said bracket. Brackets 99 are secured to the frame directly below the brackets 97 to support the receiving-brackets in their lowered position in line with the lower way and in such a position that the lugs 70 on the sprocket-chains 69 will engage the box as they pass over the sprocket-wheels 100 on the shaft 101 and move the box out of the bracket and upon the lower way.

Motion is transmitted to the splint-handling mechanism by a large gear 102, in mesh with the large gear 8, and through the bevel-gears 103 to a vertical shaft 104, provided at its upper end with a bevel-gear in mesh with a bevel-gear on a transverse shaft 105 on the frame. On the end of the shaft 105 is a gear 106, from which motion is transmitted to the cam-shaft 93 by means of an idler 107 and a gear 108 on the end of said cam-shaft, and at the opposite side of said gear 106 in mesh therewith is a pinion 109, secured on the end of a shaft 110, extending across the frame and provided at its opposite end with a gear 111, from which motion is transmitted by a train of gearing 112 to the shaft 90 to actuate the sprocket-chains 69. The cam-shaft 92 is actuated by means of a gear 113 on the end thereof, to which motion is transmitted from the pinion 109 by means of an idler 114, and the operating-bars 72 are each moved longitudinally by a lever 115, pivoted intermediate its ends upon the shaft 110 and forked at its upper end to engage a pin 116 on the bar and at its lower end to embrace an eccentric 117 on a shaft 118, extending across the frame. A bracket on the frame is provided with a bearing for a short shaft 119, upon one end of which is secured a large gear 120 to engage a pinion on the shaft 118 and transmit motion thereto, and on the opposite end of said shaft 119 is a pinion 121, to which motion is intermittently imparted by a sector 122 on the shaft 105, the sectors and gears being so proportioned that at every revolution of the shaft 105 the shaft 118 is turned to move the operating-bars back and forth once, which movement is accomplished during a very small portion of the revolution of the shaft 105. The sprocket-chains and cam-shafts for operating the mechanism for handling the boxes are all driven from the same shaft 105 and in timed relation to the movement of the operating-bars.

Extending vertically beneath the bracket 97, in line with the transfer-box thereon, is a magazine 123 of a width a trifle greater than the length of the splints to receive the splints from said box when the same are released by the opening of the doors in its bottom. To move the locking-bar 63 of each box longitudinally to release the doors 62, plates 124 are secured to the bar 95 adjacent to the ends of the box being lowered, which plates are provided each with an incline, both inclines extending in the same direction and adapted to engage the ends of the bar 63. The cams 94 are each provided with an abrupt shoulder 125, so that as said cams are turned and the bar slides over the surface thereof the box is lowered gradually until it is within a very short distance of the supporting-bracket 99, when said bar slips off the shoulders, thus letting the box drop suddenly upon the said bracket, and as the brackets 97 are attached to said bar by being hooked over it the bar is free to fall still farther after the bracket 97 has been stopped by the bracket 99, the shoulder being deep enough to allow it to fall some distance. The plates 124 are rigidly secured to the bar and fall with it after the box has been stopped, and thus the incline on the plate at one end of the box is brought into contact with the end of the bar 63 and moves the same longitudinally, releasing the doors. The jar given the box by falling upon the supporting-bracket insures the opening of the doors and the dumping of its contents into the magazine. The cams 94 continuing to turn, the bar will again be raised, and the incline on the plate at the opposite end of the bar engages the lower corner of said bar 63, and as the plate is raised the incline forces the bar longitudinally in a direction opposite to that in which it was moved when the box was lowered, and the doors are thus closed before the bar again engages the hooks of the brackets 97 to raise the same. The lugs 70 on the chains engage the box and move the same out of the brackets before they are raised by the bar. The magazine 123 is pivotally supported at its lower end by being secured to a rock-shaft 126, mounted in bearings on the ends of arms 127, pivotally secured to the frame 4 at their opposite ends, and within both the upper and lower ends of said magazine are transverse partitions 128 to hold the splints straight, the partitions at the lower end being provided with ledges projecting laterally therefrom into the space between, to in a measure support the column of splints in each space and take the weight of the splints above off those in the bottom. Pivotally supported at its lower end upon the rock-shaft 126 to turn thereon is a second or tube magazine 129, adapted to be turned up fairly against the front side of the rear magazine, the upper portion of said tube-magazine being formed of a board for the purpose of closing the front side of the rear magazine, and the lower portion consists of two parallel plates 130, spaced apart, with tubes 131 between opening through the plates and brazed therein at their ends, each of which tubes is of a size and length to take in a match-splint. The rear ends of these tubes open directly into the rear magazine, and the forward ends of the same are closed by a plate 132, provided with openings adapted to register with the ends of said tubes when moved diagonally in its guides to so register, a cam 133, sleeved on the rock-shaft 126, being provided to move the plate in one direction and a cam-hook 134 to engage a hook 135 on the plate and move the same in the opposite direction, said cam and hook being actuated in timed relation to the movement of the magazine by a sprocket-wheel driven in any suitable manner. When the magazine 123 has been sufficiently filled with splints by the transfer-boxes, both magazines are turned from their vertical to a horizontal position with the upper or outer end of the tube-magazine resting upon supports on the plate 26, and then both are vibrated to shake the splints from magazine 123 into the tubes of magazine 129. After the tubes are filled both magazines are turned to their vertical position, it being necessary to lift the tube-magazine with the other to prevent the remaining splints in the rear magazine from falling out, and then the tube-magazine is again lowered and the plate 132 moved to allow the splints therein to pass downward through the openings in the plate. The tube-magazine is then vibrated to discharge its splints and is again raised to its perpendicular position against the forward side of the rear magazine, when more splints are supplied to the rear magazine by the next transfer-box and the magazines vibrated to shake the splints down and straighten them out.

The foregoing operation of raising and lowering the magazines and shaking the same all in timed relation to the movement of the other parts of the machine is accomplished by employing the following mechanism: To turn the magazine 123 from its vertical position to a horizontal and back again, a gear 136 is secured to one end of the rock-shaft 126 outside the frame, and on the short shaft 10, adjacent to the gear 9, is a gear 137 of a seventy-two-tooth size, but having but seven teeth, which teeth engage the forward side of the gear 136 to lower said magazine, and engaging the rear side of said gear to raise said magazine is the gear 138 on the shaft 7, which gear is a duplicate of the gear 137.

The magazine 129 is turned, as above described, by providing gears 139, which are sleeved upon the rock-shaft 126, at each side thereof, and provided each with a shank to which the magazine is secured, so that said gears will operate the magazine, and both will turn together freely upon said rock-shaft. (See Fig. 6.) Secured upon the shaft 7 just inside the frame at each side are the gears 140 of a seventy-two-tooth size having seven teeth and twenty-one blank and seven teeth and thirty-seven blank to engage the gears 139 at their rear side and raise the magazine twice during each revolution of said gear 140. To engage the gears 139 at their forward side and lower the magazine twice during each cycle of operation, gears 141, also of a seventy-two-tooth size, are provided, having seven teeth and thirty-three blank and seven teeth and twenty-five blank, one of said gears being secured to the inner end of the short shaft 10 and the other to the inner end of a similar short shaft 142 at the opposite side of the machine. (See Fig. 3.) The shaft 142 is driven by a large gear 143 on its outer end in mesh with a like gear 144 on the outer end of the shaft 7.

As previously described, the rock-shaft 126 is mounted in bearings on the ends of arms 127, pivotally secured at their forward ends to the frame, and therefore the magazines may be raised slightly or vibrated by raising the free ends of said arms. For this purpose each arm 127 is provided at its free end with a downwardly-extending pawl 145, rigidly secured thereto, and secured to a shaft extending across the frame are ratchet-wheels 146 to engage the pawls, and as the ratchets are turned and the pawl slips over the teeth the arms will be raised and lowered slightly and the magazines vibrated. On the same shaft with the ratchet-wheels is secured a pinion 147, and mounted in bearings on the frame and extending across the same directly beneath the ratchet-wheels is a shaft 148, provided with a gear in mesh with the pinion 147 to transmit motion thereto from shaft 148, which shaft is intermittently rotated by providing a gear 149 (see Fig. 3) on its outer end, driven by a gear 150, mounted on the short shaft 142 and of a seventy-two-tooth size, having twenty-four teeth and fifteen blank, twelve teeth and seven blank, and six teeth and seven blank. Intermittent motion is thus transmitted to the ratchets in timed relation to the movement of the magazines, as before described.

The upper end of the magazine 123 is open to receive the splints from the transfer-boxes, and therefore it is necessary to make provision for holding the splints therein and to prevent them falling down and becoming crossed. To this end the end walls of the extreme upper end of the magazine are extended forwardly over the upper end of the tube-magazine and provided with transverse guide-slots 151 and vertical slots extending downward from the rear end of the transverse slots in the center line of the magazine. Within these slots, with its ends projecting through the same, is a presser-bar 152, extending across the magazine and provided at its lower edge with angle-strips 153 (see Fig. 20) to fit between the transverse partitions in the upper ends of said magazine, which partitions are slotted vertically to correspond with the end walls. Upon the outer side of each end wall of the magazine are secured longitudinally-movable bars 154, jointed at 155 and pivotally attached at their upper ends to the ends of said bar 152 by being provided with slotted openings in their ends to receive studs 156 on said bar, and attached at one end to the magazine and at their opposite ends to the lower ends of said bars 154 are springs 157. Secured at one end to a cross member of the machine-frame are the stops 158, in line with the transverse portion of the slots 152, and also secured to said cross member are downwardly and forwardly extending curved bars, forming the lifting-tracks 159 to engage the rolls 160 on the bars 154 when the magazine is swung to its vertical position and raise the said bars against the action of the springs 157. When the magazine 123 is turned from its vertical position, the presser-bar 152 will be forced rearward in the slot 151 by the spring 161, which engages the forward edge of the jointed upper portion of the bars 154, and if the magazine is more than full—that is, if the splints lie above the upper ends of the partitions 128—they will be pushed off over the back of the magazine by the presser-bar. When said presser-bar has moved to the rear end of the slots, the springs 157 will pull it down into the vertical portion of said slots upon the top of said splints in the magazine as far as the splints will permit, according to how full the magazine is, and thus said splints will be held in the magazine by the presser-bar, and a pressure will thus be put on the splints to hold them from moving. When the magazine is again raised, the rolls 160 engage the ends of the inclines or tracks 159, which gradually raise the bars 154 until the presser-bar is raised to the upper end of the vertical slot, when the stops 158 engage the ends of said bar and force the same forward in said slot and from over the splints, leaving the end of the magazine open to receive the contents of the next transfer-box.

To receive the splints from the tube-magazine and transfer them to the chain A, a receiver 162 and a carriage 163 to receive and support the receiver and transfer the same back and forth from beneath the magazine to beneath the chain is provided. Ways or tracks are provided for the carriage for supporting the same and upon which it is freely movable, said tracks consisting of pairs of longitudinal ribs 164 to engage corresponding grooves 165 in each side of the carriage, which ribs are formed on suitable supporting-frames 166, secured to the machine-frame. The carriage consists of a rectangular frame having its side bars formed with teeth at their lower edges to form racks which are engaged by gear-wheels 167 on a transverse shaft 168, mounted in bearings on the machine-frame, to positively and accurately move the carriage back and forth on its track, and the receiver consists of a rectangular frame 169, corresponding in size and shape to the tubular portion of the magazine 129 and also corresponding thereto in being formed with parallel plates, secured to its sides with tubes 170 (see Fig. 7) between, opening through said plates and braced therein at their ends, said tubes being of the same size as those in the magazine, but somewhat longer, and closed at their lower ends by pins 171, which project into their lower ends and are secured to a movable bottom 172. Said bottom is attached to the frame of the receiver by bolts 173, one secured in an ear on the frame near each corner thereof, which bolts extend downward through eyes on the bottom and are provided with lock-nuts at their lower ends to adjustably limit the movement of said bottom thereon, so that when said bottom is in contact with the nuts or in its lowest position the upper ends of the pins 171 will project into the tubes a short distance. The receiver is guided and supported by laterally-projecting arms 174, extending from the sides of the receiver-frame at a distance from each corner thereof, and the supporting-frames 166 are formed with longitudinal slots forming guideways 175 to receive the ends of said arms which are of a width to fit within said slots. Vertical extensions 176 of said slots or ways are also provided at each end of the ways at such a point that when the receiver is raised to bring it into contact with the magazine to receive splints therefrom or with the chain to deliver the splints thereto said arms will pass up the vertical guide-slots 176 and the tubes of the receiver will be accurately registered with those of the magazine or with the holes in the chain-plates. The arms are provided with shoulders 177 and 178 to engage the inner sides of the frames 166 and prevent any lateral movement of the receiver. In the upper edge of the side bars of the carriage are notches 179 to receive the lower edge of the arms 174, and thus the receiver is held in place upon and supported by the carriage when lowered to move therewith. The arms 174 project through the guide-slots a short distance, and to engage these projecting ends and lift the receiver up against the magazine a T-bar 180 is provided at the outer side of each guide-frame 166, which bars are forked at their lower ends to embrace the shaft 11 and are each provided with an antifriction roll or stud 181 to engage the cam-grooves of the cams 182 on said shaft. Similar T-bars 183 are provided to lift the receiver up against the chain, said bars being provided with forked lower ends to engage the cam-shaft 13 and with rolls 184 to engage the cam-grooves of the cams 185. The tubes of the magazine and receiver are arranged to correspond with the rows of holes in a section of the chain equal in length to the width of the magazine, and when the receiver has been filled with splints and has been moved over to and up against the chain the splints are shoved out of the tubes into the holes in the chain by the pins 171, the bottom 172 being lifted by a vertically-movable bed 186, which is raised against the lower side of the receiver-bottom by a cam 187 on the shaft 188, to which motion is transmitted from the shaft 13 by the gears 189. The standard 190, upon the upper end of which the bed is secured, is guided and supported by the shafts 13 and 188, which pass through slots therein, and a roll or stud 191 on said standard engages the cam-groove of the cam 187. In each end of each plate forming the chain is an opening 194, and projecting upward from the upper edges of the transverse bars of the receiver-frame 169 are the pins 195 to engage said openings 194 and center the chain-plates to bring the holes into which the splints are stuck in these plates exactly in line with the ends of the tubes in the receiver when said receiver is raised into contact with the chain to deliver its splints thereto. As the chain is held against the plate 26 by the ways 193 and all strain taken from it by the positively-driven sprocket-wheels 25 at each side of the machine, the pins 195 will always enter the openings in the plates and adjust each accurately over the tubes, both longitudinally and laterally, thus obviating all possibility of trouble arising from the stretching of the chain or wearing of any of the parts. The cams 185 for raising the receiver into contact with the chain and the cam 187 for lifting the bottom 172 to force the splints into the chain are preferably so shaped and arranged that the receiver will first be raised and held in contact with the chain until the bottom has been raised and the splints forced into the chain and then suddenly lowered while the bottom is yet held raised. The tubes of the receiver are thus cleared at each operation by the pins on the bottom, which are of such a length that when the receiver drops the pins will be projected through the tubes and carry everything out. The top of the receiver is swept clean as it is moved along its ways in each direction by a brush 196 (shown in Fig. 8) projecting downward from the frame or from the inner way 193 adjacent to the inner edge of the chain. By this arrangement the carrier-chain A may be filled very rapidly with splints, as a whole section of the chain is filled at each operation and the mechanism for handling the splints is such as to insure accuracy and precision and to obviate the possibility of the clogging of the machine or breaking the splints. The carrier-chain A after conveying the splints through the various stages of their manufacture is passed through the unloading-machine H, where the finished matches are punched from the chain and fall into the match-boxes, and thence onto the sticking-machine, where it is again filled with splints.

As shown in Figs. 25, 26, and 27, the unloading-machine consists of a frame 197, upon which are mounted two parallel transverse shafts 198, provided with large sprocket-wheels 199 for the auxiliary carrier-chains 200. There are two of these carrier-chains, one to engage each edge of the main carrier at one side thereof, and each chain is provided with teeth or lugs 201 on its outer face to engage and embrace the laterally-extending lugs 202 on the main carrier, which carrier is led into the unloading-machine in such a manner as to lie closely against the auxiliary chains at one side of the sprockets with the matches extending outward from its side opposite that engaged by the chains 200. Extending from the inner face of each auxiliary carrier-chain are the lugs 203 to engage openings in the periphery of the sprockets 199, and extending laterally from the outer side of each are the lugs or teeth 204, by means of which these chains are held and accurately moved, the main carrier being held, and thus accurately fed forward by the auxiliary carriers. Secured to the upper ends of two vertical shafts 205, one adjacent to the outer side of each auxiliary chain, are the worms 206 to engage the teeth 204 and accurately feed the chains, one-half of each turn of the threads of these worms being formed with a pitch and the other half being straight, so that as the worms are revolved they will feed the chains forward during one half of each revolution and during the other half will hold the same from moving. The main carrier-chain A after passing the auxiliary carrier passes over the idlers 207, thence upward over the large sprockets 208 at the rear of the machine, and onto the sticking-machine. Longitudinally movable in guides 209 on the frame are the arms 210, connected at one end by a bar 211, which bar is provided with a row of fingers or pins 212, and mounted in bearings on the frame is a transverse shaft 213, upon which is secured the cams 214, provided with cam-grooves engaged by rolls on the rear ends of the arms 210, so that as the shaft is turned the cams move the arms in their ways and project the fingers into the holes of the main carrier-chain to eject the matches therefrom. The shaft 210 is actuated by being provided with a bevel-gear to engage a bevel-gear on the upper end of a vertical shaft 215, to which motion is transmitted by bevel-gears from a horizontal shaft 216, connected to the main drive-shaft I by bevel-gears to receive motion therefrom. To actuate the vertical shafts 205, bevel-gears are secured to their lower ends to engage bevel-gears on the horizontal shaft 217, mounted in bearings in the frame and to which motion is transmitted from the shaft 216 by bevel-gears and a short shaft 218. The carrier-belt 219, upon which the empty matchboxes are placed, extends adjacent to the front side of the main carrier, so that as the matches are punched from the chain they will fall directly into the boxes. This belt runs over pulleys 220 and 221, mounted on shafts in bearings on the frame, the shaft upon which the pulley 221 is mounted being provided with a friction-wheel 222, which is actuated to turn the shaft and move the belt by a friction-disk 223 on the upper end of a vertical shaft 224 driven from the shaft 215 by a train of gearing 225. The friction-disk 223 is splined on its shaft, so that it may be raised into contact with the friction-wheel or lowered out of contact therewith by the levers 226, and therefore the belt may be stopped or started at the will of the operator. The auxiliary carrier firmly engages and holds the main carrier, and the screw-feed insures the accurate registry of the holes in the chain with the ejecting-fingers, so that the chain will be rapidly unloaded without injury to the chain or matches.

Having thus fully described my invention, what I claim is—

1. The combination with a continuously-moving endless carrier-chain and a sticking-machine for inserting match-splints therein; sprocket-wheels mounted on the machine-frame for engaging and moving the portion of the carrier-chain passing through said machine, means for imparting an intermittent motion to said sprockets, a clutch for disconnecting said means, means for imparting a continuous movement to the sprockets, a clutch for disconnecting the means for actuating the sprockets continuously, a driving-shaft, a clutch for transmitting motion from said shaft to operate the splint-sticking mechanism, and a hand-lever to operate said clutches simultaneously, whereby the splint-sticking mechanism is stopped and a continuous instead of an intermittent movement imparted to the carrier-chain.

2. In combination with a carrier-chain formed of connected plates provided with openings to receive match-splints; of guides for a portion of said chain to prevent lateral movement thereof; sprocket-wheels at each end of the guides to drive the chain and take the strain from the guided portion of the chain, means for inserting match-splints in that portion of the chain from which the strain is taken, and means for centering the plates of said portion of the chain to register the openings therein with the means for inserting the splints.

3. In combination with a horizontally-traveling carrier, of a magazine located at one side of the carrier and adapted to deliver splints in a vertical position, a horizontally-movable receiver adapted to receive the splints from the magazine and hold the same in a vertical position, and means for reciprocating the receiver beneath the magazine and carrier to receive the splints from the magazine and deliver the same to the lower side of the carrier.

4. In combination with a horizontally-traveling carrier for conveying match-splints through the several stages of their manufacture into matches and means over which the splints are carried by the carrier for converting the splints into finished matches; of a magazine for holding splints spaced and in a vertical position a receiver for receiving the splints from said magazine and holding the same spaced and in a vertical position, means for moving the receiver from the magazine to beneath the carrier, and vertically-movable means on the receiver to force the splints upward into the lower side of the carrier.

5. In combination with a horizontally-traveling carrier-chain formed of connected plates provided with openings to receive match-splints, of a magazine located at one side of the chain a rectangular receiver provided with vertical tubes to receive match-splints from the magazine and hold the same spaced to correspond to the spacing of the openings in the several chain-plates, and means for moving the receiver from the magazine into engagement with the chain.

6. In combination with a horizontally-traveling carrier-chain formed of connected plates provided with openings to receive match-splints, a magazine supported at one side of said chain and adapted to deliver matches in a vertical position, guideways extending beneath the magazine at one end and the chain at their opposite ends, a receiver movable on said ways and adapted to receive and hold the splints in a vertical position, means for reciprocating the receiver on said ways to bring the same alternately beneath the magazine and carrier, and means carried by the receiver for forcing the splints vertically into the chain.

7. The combination with means for carrying match-splints, of a receiver having a series of tubes open at each end, means for inserting splints into one end of said tubes, pins supported with one end projecting into the opposite ends of the tubes to close the same, means for moving the receiver into proximity with the carrier, and means for forcing the pins into the tubes to force the splints from the tubes into the carrier.

8. The combination with means for carrying match-splints provided with openings to receive the splints, of a horizontally-disposed rectangular frame, vertical tubes in said frame, means for inserting splints in the upper ends of said tubes, pins projecting into the lower ends of said tubes to close the same, a movable bottom to which the pins are secured at their lower ends, and means for moving the bottom to force the pins into the tubes and eject the splints therefrom.

9. The combination with means for carrying match-splints provided with openings to receive the splints; of a receiver consisting of a rectangular frame, plates secured to the upper and lower sides of said frame and tubes secured between said plates with their ends opening through the same; a movable bottom; bolts for guiding and limiting the movement of said bottom; pins secured at one end to said bottom with their opposite ends projecting into the lower ends of the tubes to close the same; means for moving the receiver into proximity with the carrier, and means for moving the bottom to force the splints from the tubes into the carrier.

10. The combination with means for carrying match-splints, of a rock-shaft, a receiving-magazine pivoted on said rock-shaft and having an open side, a magazine pivoted on said shaft to turn independently of the other magazine and adapted to be turned into engagement with said open side to close the same and provided with tubes open at each end to receive the splints from said receiving-magazine, a plate to close one end of said tubes, means for moving said plate, a reciprocating receiver adapted to receive the splints from the tube-magazine and deliver the same to the carrier, gears secured to each magazine to turn the same on the rock-shaft, gears to engage and turn said gears on the magazines and provided with teeth alike on each whereby the magazines are raised and lowered together and the gears for actuating the tube-magazine, provided with teeth for raising and lowering the tube-magazine independently of the receiving-magazine, and means for actuating the gears in timed relation to the movement of the receiver.

11. The combination with means for carrying match-splints, of a receiver provided with vertical tubes to receive and hold match-splints, means for forcing the splints from said tubes into the carrier, arms pivoted at one end and provided with bearings at their opposite ends, a rock-shaft mounted in said bearings, a magazine pivoted to turn upon the axis of said shaft into engagement with the receiver and having tubes to register with the tubes of said receiver, means for supplying splints to said magazine, a shaft vertically beneath the rock-shaft, ratchets on said shaft, pawls rigidly secured to said arms and extending downward into engagement with said ratchets, and means for intermittently turning said shaft.

12. The combination with means for carrying match-splints, of a frame for supporting said carrier in a horizontal postion, a reciprocating receiver adapted to receive match-splints from a source of supply and hold the same in a vertical position, guideways for said receiver extending beneath the carrier and provided with vertical extensions for guiding the receiver vertically into engagement with the carrier, means for raising the receiver into engagement with the carrier to deliver the splints thereto, and means for reciprocating the receiver.

13. The combination with means for carrying match-splints, of a frame for supporting said carrier in a horizontal position, a reciprocating receiver adapted to receive splints from a source of supply and hold the same in a vertical position, a carriage for supporting and carrying said receiver, a track extending beneath the carrier upon which the carriage moves, means for reciprocating the carriage on its track, and means for delivering the splints from the receiver to the carrier.

14. The combination with means for carrying match-splints, of a frame for supporting said carrier in a horizontal position, tracks extending beneath the carrier, a carriage movable on said tracks and having teeth forming a rack at its lower side, a gear engaging said rack to move the carriage along its track, a receiver for receiving and holding splints in a vertical position, guideways for the receiver having vertical extensions, and means for raising the receiver into proximity with the carrier to deliver the splints thereto.

15. The combination with means for carrying match-splints, of a frame for supporting said carrier in a horizontal position, means for supplying match-splints supported adjacent to one side of the carrier, tracks extending beneath said means and carrier, a carriage movable on said tracks and provided with teeth along the lower edges of its sides forming racks and having notches in the upper edges of its sides, gears engaging said racks, a receiver adapted to receive splints from said supply and hold the same in a vertical position, guideways for the receiver having vertical extensions beneath the supply and carrier, arms on the receiver engaging said guideways and adapted to engage the notches in the carriage to hold the receiver in position thereon, and means for engaging said arms when opposite the vertical portions of the guideways to raise the receiver.

16. The combination with means for carrying match-splints having openings to receive the same, of a frame for supporting said carrier in a horizontal position, a magazine for supplying splints supported at one side of the carrier, ribs on the frame extending beneath the magazine and carrier, a carriage provided with grooves in its sides to engage said ribs and formed with teeth on the lower edges of its sides and having notches in the upper edges of its sides, gears to engage the teeth on said carriage, a receiver consisting of a rectangular frame having vertically-extending tubes open at each end secured therein and spaced to correspond to the spacing of the openings in the carrier, guide-bolts on said receiver-frame, a movable bottom guided on said bolts, pins secured at one end to said bottom and projecting into the lower ends of the tubes of the receiver, slots forming guideways and provided with vertical extensions beneath the carrier and magazine, arms extending laterally from the sides of the receiver into said guide-slots and adapted to engage the notches in the carriage, vertically-movable T-bars opposite the vertical portions of the guide-slots to engage said arms and raise the receiver into engagement with the magazine and carrier, cams for operating said T-bars, and means for raising said movable bottom to force the splints from the receiver into the carrier.

17. The combination with means for carrying match-splints, of a receiver provided with a series of vertical tubes adapted to receive splints from a source of supply and open at each end, means for raising and lowering said receiver, a series of pins of a length equal to or greater than the length of said tubes supported with one end projecting into said tubes to close the same, and means to force the splints into the carrier and to hold the pins in engagement with the splints until the receiver is lowered.

18. The combination with means for carrying match-splints, of a frame for supporting the carrying means in a horizontal position, a receiver provided with vertical tubes open at each end, pins of equal or greater length than the length of the tubes movably supported with one end projecting into the lower ends of said tubes, means whereby the pins may be projected through the tubes, guideways upon which the receiver is longitudinally movable from beneath the carrier, means for moving the receiver along its ways, and a brush supported adjacent to the path of the receiver to sweep the top thereof as said receiver is reciprocated on its ways.

19. The combination with means for carrying match-splints, of a frame for supporting said means in a horizontal position, ways extending beneath said carrying means, a receiver on said ways having vertical tubes open at each end, means for moving the receiver on its ways, movable pins projecting into the lower ends of said tubes, vertical guides for the receiver below the carrying means, cams to raise said receiver into engagement with said carrying means, a vertically-movable bed below the carrying means and out of the path of the receiver, and a cam to raise the bed to force the pins into the tubes and to hold the same raised until the receiver is lowered.

20. The combination with means for carrying match-splints, provided with openings to receive the same, a receiver to receive and hold the splints in position to be inserted in the carrying means, and means for inserting the splints; of a magazine pivoted to turn from a vertical to a horizontal position to deliver splints to the receiver and provided with tubes spaced apart to correspond to the spacing of the openings in the carrying means, a pivoted magazine having an open end and an open side closed by the tube-magazine, means for supplying horizontally-extending splints to the upper open end when said receiving-magazine is in its vertical position, a presser-bar within the said upper end to engage the splints in the magazine and prevent the same from falling down when the magazine is turned to its horizontal position, and means operated by the turning of the magazine to its vertical position for moving the presser-bar out of the end thereof.

21. The combination with means for carrying match-splints, a receiver to receive and hold the splints in position to be inserted in the carrying means, and means for inserting the splints; of a magazine pivoted to turn from a vertical to a horizontal position to deliver splints to the receiver and provided with tubes to receive the splints, a pivoted magazine having an open end and an open side closed by the tube-magazine, means for supplying splints in a horizontal position to the upper end of said receiving-magazine, a presser-bar movable in the receiving-magazine and adapted to engage the splints when the magazine is turned from its vertical position, a spring to hold the bar in contact with the splints, and a lifting-track rigidly supported in a position to engage and lift the bar when the magazine is turned to its vertical position.

22. The combination with means for carrying match-splints provided with openings to receive the same, a receiver to receive and hold the splints in position to be inserted in the carrying means, and means for inserting the splints; of a magazine pivoted to turn from a vertical to a horizontal position to deliver splints to the receiver and provided with tubes spaced to correspond to the spacing of the openings in the carrying means, a pivoted magazine having an open end, and an open side closed by the tube-magazine and provided with longitudinal slots in its end walls having lateral extensions, means for supplying splints in a horizontal position to the upper end of said receiving-magazine, a presser-bar guided within the slots in said magazine, springs exerting a force to hold said bar down upon the splints, lifting-tracks operating to lift said bar to the upper end of said slots when the magazine is turned to its vertical position, stops to engage and move the bar into the lateral portion of the slots, and springs to move the bar out of said lateral portion of the slots when the magazine is turned to a horizontal position.

23. The combination with means for carrying match-splints, and means for conveying the splints to and inserting the same in the carrying means; of a hopper open at its bottom, upper and lower ways beneath said hopper, a series of transfer-boxes on said upper ways forming the bottom of the hopper, means for forcing said series of boxes along the upper ways and releasing the box at the forward side of the hopper, receiving-brackets to receive the released box from the upper way and hold the same in an upright position and lower it to the lower way, means for moving said box along the lower way to the rear of the hopper, and a lift at the rear end of the lower way to raise said box to the rear of the upper way.

24. The combination with means for carrying match-splints, and means for conveying the splints to and inserting the same in the carrying means; of a hopper open at its bottom, upper and lower ways beneath said hopper, a series of transfer-boxes supported by said upper ways and forming the bottom of the hopper, doors forming the bottoms of said boxes, a vertically-movable lifter to raise said boxes one at a time from the lower to the upper way at the rear end thereof, operating-bars to engage the box lifted and force the same beneath the hopper to move the series of boxes and eject one from the forward end, a vertically-movable receiving-bracket to receive and lower the ejected box to the lower way, means operated by the lowering of said box for opening the doors in its bottom to deliver the splints therein to the conveying and inserting means, and sprocket-chains to move the said box upon the lower way to the lifter.

25. The combination with means for carrying match-splints, and means for conveying the splints to and inserting the same in the carrying means; of a hopper open at its bottom, upper and lower ways beneath said hopper, a series of transfer-boxes having transverse partitions and doors in their bottoms supported by the upper ways and forming the bottom of the hopper, locking-bars to engage the forward box of the series, and a swinging bar to engage and lock the rear box within the hopper, means for vibrating the hopper and boxes, a lifter to raise a transfer-box from the lower to the upper ways at the rear of the hopper, operating-bars at each side of the hopper to operate said locking-bars and swinging bars to release the boxes and to force the box from the lower way beneath the hopper to move the boxes and eject the box at the forward side, receiving-brackets to receive the ejected box and lower the same to the lower way, means operated by the lowering of the bracket for releasing of the doors of said box, cams for lowering said brackets and for raising the same, and sprocket-chains for moving the said box from the bracket and along the lower way.

26. The combination with means for carrying match-splints, and means for conveying the splints to and inserting the same in the carrying means; of a hopper open at its bottom, upper and lower ways beneath said hopper, a series of transfer-boxes movable on said ways and forming the bottom of said hopper, transverse partitions in said boxes, doors hinged to the bottom of said boxes, a longitudinally-movable bar secured to one side of each box, extensions on said doors and hooks on said bars to receive the extensions and hold the doors closed, a transverse vertically-movable bar guided and supported near the forward ends of the ways, receiving-brackets carried by said bar, means carried by said bar for engaging and moving in one direction the longitudinally-movable bar on the box being lowered to open the doors and for moving the said bar in the opposite direction to close the doors when the bar is raised, and cams for raising and lowering said bar.

27. The combination with means for carrying match-splints, and means for conveying the splints to and inserting the same in the carrying means; of a hopper open at its bottom, upper and lower ways beneath said hopper, a series of transfer-boxes movable on said ways and forming the bottom of the hopper, doors hinged to the bottom of said boxes, a longitudinally-movable bar attached to one side of each box, extensions on said doors, hooks on said bars to receive the extensions and hold the doors closed, vertical guides supported adjacent to the forward end of the hopper, a transverse bar movable in said guides, receiving-brackets carried by said bar, plates secured to said bar and each provided with an incline to engage the ends of the longitudinally-movable bar on the box being lowered, cams to raise and lower the transverse bar and provided with abrupt shoulders.

28. The combination with means for carrying match-splints, and means for conveying the splints to and inserting the same in the carrying means; of a supporting-frame, a vibratory hopper, trunnions on said hopper engaging bearings on the frame, means for intermittently vibrating said hopper, guide-plates secured to the frame at each side of the hopper and extending below the same, an upper and a lower guideway on each plate, transfer-boxes on said upper ways forming the bottom of the hopper and guided by said plates, doors in the bottom of said boxes, means for holding the doors closed, receiving-brackets to receive and lower the boxes from the upper to the lower way, means operated by the lowering of each box to open its doors, carrier-chains having lugs to engage the box lowered and move the same along the lower ways, vertically-movable bars at the rear ends of the lower ways having arms to receive the boxes, cams for raising said bars to lift the box thereon to the upper way, longitudinally-movable operating-bars, dogs carried by said bars to engage the box raised and force the same beneath the hopper, means for locking the boxes in position beneath the hopper operated by said operating-bars to release the boxes, and levers for moving said operating-bars.

29. The combination with a carrier-chain formed of connected plates having openings to receive match-splints, of a supporting-frame provided with means for guiding the chain, a transverse shaft mounted in bearings on the frame, a receiving-magazine having an open end and side and pivoted on said shaft, a magazine having transverse tubes open at each end and pivoted on said shaft to turn up against and close the open side of the receiving-magazine, a guideway supported by the frame and extending beneath the carrier-chain, a receiver movable on said way and having vertical tubes arranged to correspond with the openings in the chain-plates and adapted to receive the splints from the tube-magazine when the same is turned to a horizontal position, a rack on the receiver, a gear to engage said rack and move the receiver along the way, means for forcing the splints from the receiver into the openings in the chain-plates, gears for independently turning said magazines, a hopper supported above the upper end of the magazines, a series of transfer-boxes forming the bottom of the magazine and adapted to be forced out at the forward side of the hopper, one at a time, a way beneath the hopper, means for lowering the box forced from the forward side of the hopper to the lower way and in position above the open end of the receiving-magazine, doors in the bottom of said boxes, means for opening said doors of the box lowered to discharge its splints into the receiving-magazine, sprocket-chains for moving the box lowered, a lift to raise the box at the rear of the hopper, operating-bars to force the box raised beneath the hopper, and means for operating said parts in timed relation to the movement of the magazine.

30. In combination with a carrier-chain formed of connected plates provided with openings for the insertion of match-splints, of the machine-frame, a backing-plate secured to the frame, guides for the carrier-chain beneath said plate to hold the same in contact with its lower side, longitudinal shafts supported on brackets at each side of the frame, sprocket-wheels on said shafts to engage and drive the carrier-chain, transverse cam-shafts mounted in bearings on the frame, a bevel-gear on one of said shafts having a number of its teeth cut away, a longitudinal shaft, a gear on said longitudinal shaft in mesh with the gear on the cam-shaft, a train of gearing to transmit motion from said longitudinal shaft to one of the shafts carrying the sprocket-wheels, supporting-frames secured to the machine-frame at each side thereof and provided with slots forming longitudinal ways and vertical extensions at each end of said ways, tracks on said frames consisting of longitudinal ribs, a carriage consisting of a rectangular frame having grooves to receive said ribs and provided with teeth along the lower edge of its side bars to form racks, a transverse shaft below the tracks to which motion is transmitted from the cam-shafts, gears on said transverse shaft to engage the teeth on the carriage and move the same along its track, a rectangular receiver provided with vertical tubes spaced to correspond to the spacing of the openings in the carrier-chain, a movable bottom for said receiver, pins on said bottom projecting into the lower ends of the tubes to close the same, laterally-extending arms on the receiver to project through the guideways, T-bars at the forward and rear end of said ways to engage said arms and raise the same in the vertical extensions of said ways, cams on the cam-shafts to operate said T-bars, a vertically-movable bed between the ways below the carrier-chain, a cam on one of said cam-shafts to raise said bed into contact with the movable bottom of the receiver, arms pivotally secured at one end to the machine-frame and provided with bearings at their opposite ends, a shaft in the bearings on said arms, magazines pivotally supported at one end on said shaft and adapted to be turned from a vertical to a horizontal position to engage the upper side of the receiver, a hopper supported on the machine-frame above the upper end of said magazines, means for inserting matches in a horizontal position in the upper end of one of said magazines when the same is in its vertical position, downwardly-extending pawls on the said arms, ratchet-wheels to engage said pawls, gears to independently actuate said magazines, gears of larger diameter having their teeth arranged to intermittently operate the gears for actuating said magazines, and a gear having its teeth arranged to intermittently actuate the ratchets.

In testimony whereof I affix my signature in presence of two witnesses.

GEORGE EVERSON.

Witnesses:
LEWIS E. FLANDERS,
OTTO F. BARTHEL.